(12) United States Patent
Zheng et al.

(10) Patent No.: US 12,199,725 B2
(45) Date of Patent: Jan. 14, 2025

(54) MAC CE FOR BEAM FAILURE RECOVERY

(71) Applicant: QUALCOMM Incorporated, San Diego, CA (US)

(72) Inventors: Ruiming Zheng, Beijing (CN); Linhai He, San Diego, CA (US); Yan Zhou, San Diego, CA (US); Tao Luo, San Diego, CA (US)

( * ) Notice: Subject to any disclaimer, the term of this patent is extended or adjusted under 35 U.S.C. 154(b) by 337 days.

(21) Appl. No.: 17/597,152

(22) PCT Filed: Jul. 31, 2020

(86) PCT No.: PCT/CN2020/106135
§ 371 (c)(1),
(2) Date: Dec. 28, 2021

(87) PCT Pub. No.: WO2021/018280
PCT Pub. Date: Feb. 4, 2021

(65) Prior Publication Data
US 2022/0311500 A1    Sep. 29, 2022

(30) Foreign Application Priority Data

Jul. 31, 2019  (WO) ................ PCT/CN2019/098531
Aug. 5, 2019   (WO) ................ PCT/CN2019/099255

(51) Int. Cl.
*H04B 7/06*     (2006.01)
*H04L 5/00*     (2006.01)
(Continued)

(52) U.S. Cl.
CPC ......... *H04B 7/0695* (2013.01); *H04L 5/0035* (2013.01); *H04W 76/19* (2018.02); *H04W 80/02* (2013.01)

(58) Field of Classification Search
CPC . H04B 7/0695; H04B 7/06964; H04L 5/0035; H04L 5/0091; H04L 5/001;
(Continued)

(56) References Cited

U.S. PATENT DOCUMENTS

2019/0190582 A1*  6/2019  Guo .................... H04L 27/2607
2020/0052769 A1*  2/2020  Cirik ..................... H04L 5/0094
(Continued)

FOREIGN PATENT DOCUMENTS

CN        109391993 A     2/2019
CN        109997397 A     7/2019
(Continued)

OTHER PUBLICATIONS

Ericsson: "On the Use of SS for Beam Management and Beam Recovery," R1-1714295, 3GPP TSG-RAN WG1 #90, 3rd Generation Partnership Project (3GPP), Mobile Competence Centre, 650, Route Des Lucioles, F-06921 Sophia-Antipolis Cedex, France, vol. Prague, Czech Republic, Aug. 21-25, 2017, Aug. 25, 2017 (Aug. 25, 2017), 8 Pages, XP051317081, Retrieved from the Internet: URL: https://www.3gpp.org/ftp/TSG_RAN/WG1_RL1/TSGR1_90/Docs/, [retrieved on Aug. 20, 2017], Section 2.1, The Whole Document.
(Continued)

*Primary Examiner* — Harry H Kim

(57) ABSTRACT

Aspects for MAC CE configurations for beam failure recovery operations are disclosed. In one aspect, a method of wireless communication comprising: determining, by a user equipment (UE), a beam failure recovery for a serving cell; transmitting, by the UE, a beam failure recovery request for the serving cell; and transmitting, by the UE, a MAC CE including new beam information and including serving cell identification information multiple serving cells, including the serving cell, wherein the serving cell identification
(Continued)

information identifies the multiple serving cells. In another aspect, the MAC CE may include bandwidth part information. Other aspects and features are also claimed and described.

30 Claims, 13 Drawing Sheets

(51) Int. Cl.
*H04W 36/00* (2009.01)
*H04W 36/06* (2009.01)
*H04W 48/16* (2009.01)
*H04W 76/19* (2018.01)
*H04W 80/02* (2009.01)

(58) Field of Classification Search
CPC .... H04L 5/0023; H04L 5/0048; H04W 76/19; H04W 80/02; H04W 36/0085; H04W 36/06; H04W 48/16
See application file for complete search history.

(56) References Cited

U.S. PATENT DOCUMENTS

| | | | |
|---|---|---|---|
| 2020/0322035 A1* | 10/2020 | Shi | H04W 72/046 |
| 2021/0013948 A1* | 1/2021 | Agiwal | H04W 80/02 |
| 2021/0028849 A1* | 1/2021 | Chin | H04B 7/06964 |
| 2021/0029724 A1* | 1/2021 | Tsai | H04W 28/0278 |
| 2021/0184733 A1* | 6/2021 | Cao | H04W 76/27 |
| 2021/0314051 A1* | 10/2021 | Yang | H04L 5/001 |
| 2022/0149922 A1* | 5/2022 | Wang | H04W 76/19 |
| 2022/0368406 A1* | 11/2022 | Kang | H04B 7/061 |

FOREIGN PATENT DOCUMENTS

| | | |
|---|---|---|
| CN | 110035502 A | 7/2019 |
| CN | 110036594 A | 7/2019 |
| EP | 4005319 A1 | 6/2022 |
| WO | WO-2019032882 A1 | 2/2019 |
| WO | WO-2019070437 | 4/2019 |
| WO | WO-2019119399 A1 | 6/2019 |
| WO | WO-2019124983 A1 | 6/2019 |
| WO | WO-2019130064 A1 | 7/2019 |
| WO | WO-2019135654 A1 | 7/2019 |
| WO | WO-2019137378 A1 | 7/2019 |

OTHER PUBLICATIONS

International Search Report and Written Opinion—PCT/CN2019/099255—ISAEPO—Apr. 24, 2020.
International Search Report and Written Opinion—PCT/CN2020/106135—ISA/EPO—Nov. 4, 2020.
International Search Report and Written Opinion—PCT/CN2019/098531—ISA/EPO—Mar. 27, 2020.
Nokia, et al., "SCell Beam Failure Recovery", 3GPP TSG-RAN WG2 Meeting #101 bis, R2-1805342, 3rd Generation Partnership Project (3GPP), Mobile Competence Centre; 650, Route Des Lucioles, F-06921 Sophia-Antipolis Cedex, France, vol. RAN WG2, No. Sanya, China, Apr. 16, 208-Apr. 20, 2018, Apr. 6, 2018, XP051415970, 3 Pages, p. 1, Paragraph 2.1, p. 2, Paragraph 2.3.
Supplementary European Search Report—EP20846380—Search Authority—Munich—Jul. 5, 2023.
Huawei, et al., "Beam Failure Recovery for SCell", R1-1903977, 3GPP TSG RAN WG1 Meeting #96bis, Xi'an, China, Apr. 8-12, 2019, 7 Pages.
RAN1: "LS on MAC CE design for SCell BFR", R2-1908613, 3GPP TSG RAN WG2#107, Prague, Czech Republic, Aug. 26-30, 2019, 1 Page.

* cited by examiner

1000

| | | | | |
|---|---|---|---|---|
| R | R | C | Serving Cell ID₁ 1032 | Oct 1 |
| R | T | | SSB Index ID₁ 1042 | Oct 2 |
| 1066 | 1068 | NZP CSI-RS Resource ID₁ 1052 | | Oct 3 |
| R | R | C | Serving Cell ID₂ 1034 | Oct 4 |
| R | T | 1062 | SSB Index ID₂ 1044 | Oct 5 |
| 1070 | 1064 | NZP CSI-RS Resource ID₂ 1054 | | Oct 6 |

... Oct 7

| | | |
|---|---|---|
| R | R | C | Serving Cell ID 1132 | Oct 1 |
| R | T | | SSB Index ID 1142 | Oct 2 |
| NZP CSI-RS Resource ID 1152 | | | Oct 3 |

| C | T | R | Serving Cell ID₁ 1232 | Oct 1 421 |
| Resource ID₁ 1242 | | | | Oct 2 422 |
| C | T | R | Serving Cell ID₂ 1234 | Oct 3 423 |

| J 1352 | R | Serving Cell ID₁ 1332 | Oct 1 |
| J 1362 | R | Serving Cell ID₂ 1334 | Oct 2 |
| Resource ID₁ 1342 | | | Oct 3 |

*FIG. 13*

MAC CE FOR BEAM FAILURE RECOVERY

CROSS-REFERENCE TO RELATED APPLICATIONS

This application claims priority to co-pending International Patent Application Number PCT/CN2020/106135, entitled "MAC CE FOR BEAM FAILURE RECOVERY," filed Jul. 31, 2020, which claims the benefit of International Patent Application No. PCT/CN2019/099255, entitled, "MAC CE FOR BEAM FAILURE RECOVERY," filed on Aug. 5, 2019, and also the benefit of International Patent Application No. PCT/CN2019/098531, entitled, "MAC CE FOR BEAM FAILURE RECOVERY," filed on Jul. 31, 2019, all contents of these applications are incorporated herein by reference in their entirety.

TECHNICAL FIELD

Aspects of the present disclosure relate generally to wireless communication systems, and more particularly, to Medium Access Control (MAC) Control Element (CE, MAC CE) configurations for beam failure recovery operations. Certain embodiments of the technology discussed below can enable and provide higher reliability and reduced latency.

INTRODUCTION

Wireless communication networks are widely deployed to provide various communication services such as voice, video, packet data, messaging, broadcast, and the like. These wireless networks may be multiple-access networks capable of supporting multiple users by sharing the available network resources. Such networks, which are usually multiple access networks, support communications for multiple users by sharing the available network resources.

A wireless communication network may include a number of base stations or node Bs that can support communication for a number of user equipments (UEs). A UE may communicate with a base station via downlink and uplink. The downlink (or forward link) refers to the communication link from the base station to the UE, and the uplink (or reverse link) refers to the communication link from the UE to the base station.

A base station may transmit data and control information on the downlink to a UE and/or may receive data and control information on the uplink from the UE. On the downlink, a transmission from the base station may encounter interference due to transmissions from neighbor base stations or from other wireless radio frequency (RF) transmitters. On the uplink, a transmission from the UE may encounter interference from uplink transmissions of other UEs communicating with the neighbor base stations or from other wireless RF transmitters. This interference may degrade performance on both the downlink and uplink.

As the demand for mobile broadband access continues to increase, the possibilities of interference and congested networks grows with more UEs accessing the long-range wireless communication networks and more short-range wireless systems being deployed in communities. Research and development continue to advance wireless technologies not only to meet the growing demand for mobile broadband access, but to advance and enhance the user experience with mobile communications.

Conventionally, beam failure recovery (BFR) and beam failure recovery requests (BFRQ) may be used in wireless communications to facilitate recovery from failed transmissions and/or poor channel conditions. For example, in conventional operations, when the UE is suffering from poor channel conditions, the UE may receive a beam failure indication from lower layers. The UE may request for a recovery by indicating a new SS block or CSI-RS and starting a RACH (random access control channel) procedure. A base station (e.g., a gNB) may transmit a downlink assignment or an uplink grant on a PDCCH in response to end the beam failure recovery. Such procedures may not achieve low latency requirements or constraints for some operating modes, such as URLLC, (e.g., eURLLC).

BRIEF SUMMARY OF SOME EMBODIMENTS

The following summarizes some aspects of the present disclosure to provide a basic understanding of the discussed technology. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

The described techniques relate to improved methods, systems, devices, and apparatuses that support beam failure recovery processes via MAC CE, such as MAC CE based indication of serving cell information (e.g., secondary serving cell identification information (SCell ID)), new beam information (e.g., reference signals) and/or bandwidth part information (e.g., BWP ID).

In one aspect of the disclosure, a method of wireless communication comprises: determining, by a user equipment (UE), a beam failure recovery for a serving cell; transmitting, by the UE, a beam failure recovery request; and transmitting, by the UE, a MAC CE including serving cell identification information and new beam information.

In another aspect of the disclosure, a method of wireless communication comprises: determining, by a user equipment (UE), a beam failure recovery for a serving cell; transmitting, by the UE, a beam failure recovery request; and transmitting, by the UE, a MAC CE including new beam information and including serving cell identification information for multiple serving cells, including the serving cell, wherein the serving cell identification information identifies the multiple serving cells.

In an additional aspect of the disclosure, an apparatus configured for wireless communication is disclosed. The apparatus includes means for determining, by a user equipment (UE), a beam failure recovery for a serving cell; means for transmitting, by the UE, a beam failure recovery request; and means for transmitting, by the UE, a MAC CE including new beam information and including serving cell identification information for multiple serving cells, including the serving cell, wherein the serving cell identification information identifies the multiple serving cells.

In an additional aspect of the disclosure, a non-transitory computer-readable medium having program code recorded thereon. The program code further includes code to determine, by a user equipment (UE), a beam failure recovery for a serving cell; transmit, by the UE, a beam failure recovery request; and transmit, by the UE, a MAC CE including new beam information and including serving cell identification information for multiple serving cells, including the serving cell, wherein the serving cell identification information identifies the multiple serving cells.

In an additional aspect of the disclosure, an apparatus configured for wireless communication is disclosed. The apparatus includes at least one processor, and a memory coupled to the processor. The processor is configured to determine, by a user equipment (UE), a beam failure recovery for a serving cell; transmit, by the UE, a beam failure recovery request; and transmit, by the UE, a MAC CE including new beam information and including serving cell identification information for multiple serving cells, including the serving cell, wherein the serving cell identification information identifies the multiple serving cells.

In one aspect of the disclosure, a method of wireless communication comprises: transmitting, by a base station, a transmission; receiving, by the base station, a beam failure recovery request corresponding to the transmission; and receiving, by the base station, a MAC CE including new beam information and including serving cell identification information for multiple serving cells, wherein the serving cell identification information identifies the multiple serving cells.

In an additional aspect of the disclosure, an apparatus configured for wireless communication is disclosed. The apparatus includes means for transmitting, by a base station, a transmission; means for receiving, by the base station, a beam failure recovery request corresponding to the transmission; and means for receiving, by the base station, a MAC CE including new beam information and including serving cell identification information for multiple serving cells, wherein the serving cell identification information identifies the multiple serving cells.

In an additional aspect of the disclosure, a non-transitory computer-readable medium having program code recorded thereon. The program code further includes code to transmit, by a base station, a transmission; receive, by the base station, a beam failure recovery request corresponding to the transmission; and receive, by the base station, a MAC CE including new beam information and including serving cell identification information for multiple serving cells, wherein the serving cell identification information identifies the multiple serving cells.

In an additional aspect of the disclosure, an apparatus configured for wireless communication is disclosed. The apparatus includes at least one processor, and a memory coupled to the processor. The processor is configured to transmit, by a base station, a transmission; receive, by the base station, a beam failure recovery request corresponding to the transmission; and receive, by the base station, a MAC CE including new beam information and including serving cell identification information for multiple serving cells, wherein the serving cell identification information identifies the multiple serving cells.

In another aspect of the disclosure, a method of wireless communication comprises: determining, by a user equipment (UE), a beam failure recovery for a serving cell; transmitting, by the UE, a beam failure recovery request; and transmitting, by the UE, a MAC CE including serving cell identification information and new beam information for a single serving cell, wherein the new beam information comprises beam information for a new beam that corresponds to the determined beam failure recovery for the single serving cell.

In yet another aspect of the disclosure, a method of wireless communication comprises: determining, by a user equipment (UE), a beam failure recovery for a serving cell; transmitting, by the UE, a beam failure recovery request; and transmitting, by the UE, a MAC CE including serving cell identification information and new beam information, wherein the new beam information includes a first field and a second field, wherein the first field corresponds to a first type of new beam information, and wherein the second field corresponds to a second type of new beam information.

In one aspect of the disclosure, a method of wireless communication comprises: determining, by a user equipment (UE), a beam failure recovery for a serving cell; transmitting, by the UE, a beam failure recovery request; and transmitting, by the UE, a MAC CE including serving cell identification information and bandwidth part information.

In another aspect of the disclosure, a method of wireless communication comprises: transmitting, by a base station, a transmission; receiving, by the base station, a beam failure recovery request corresponding to the transmission, and receiving, by the base station, a MAC CE including serving cell identification information and bandwidth part information.

Other aspects, features, and embodiments of the present invention will become apparent to those of ordinary skill in the art, upon reviewing the following description of specific, exemplary embodiments of the present invention in conjunction with the accompanying figures. While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments the exemplary embodiments can be implemented in various devices, systems, and methods.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

FIGS. 4-18 are each example of a block diagram illustrating a schematic diagram of an example of a MAC CE configuration including fields thereof.

DETAILED DESCRIPTION

Figure 1:
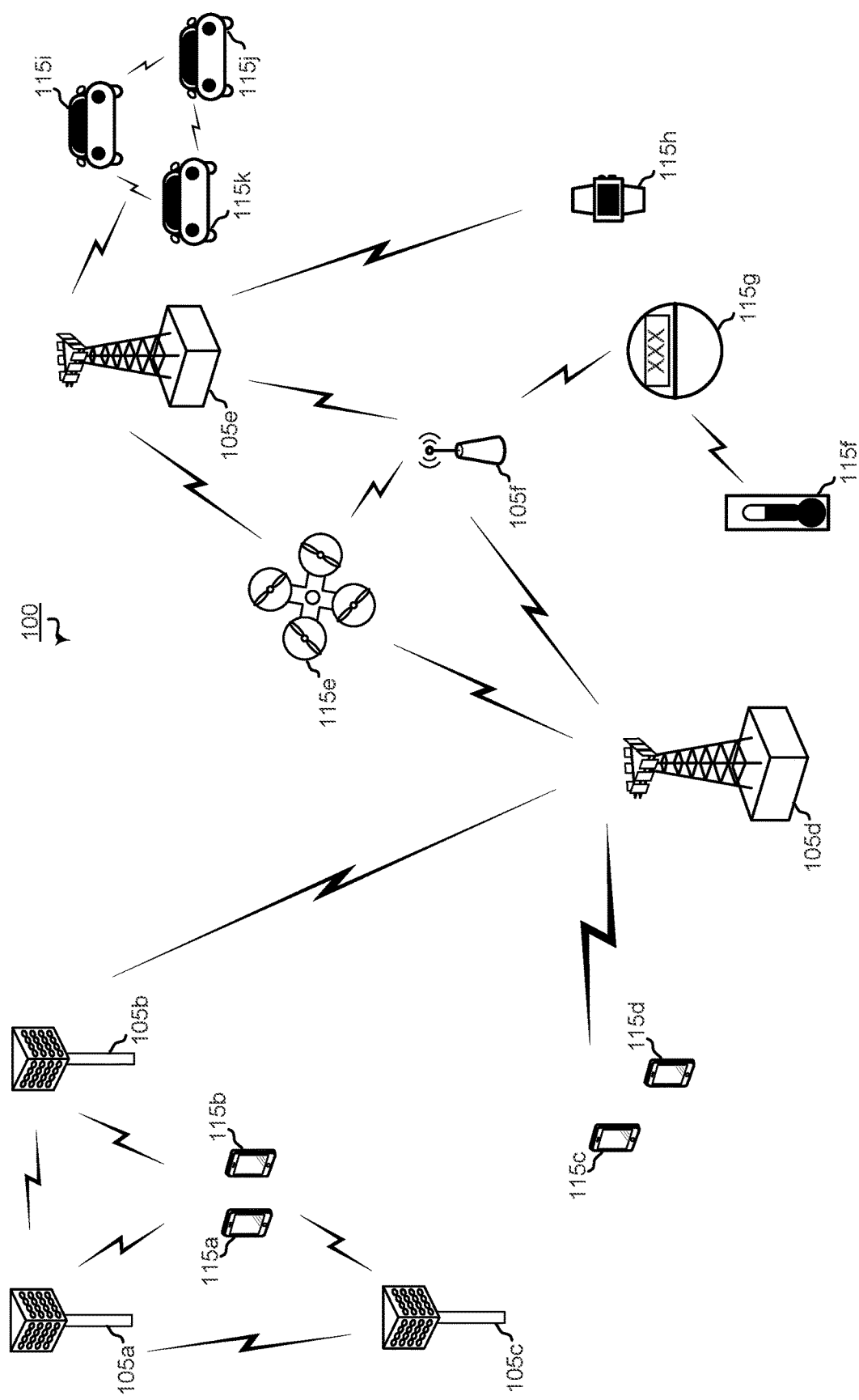
FIG. 1 is a block diagram illustrating details of a wireless communication system according to some embodiments of the present disclosure.

The described techniques relate to improved methods, systems, devices, and apparatuses that support beam failure recovery processes via MAC CE, such as MAC CE based indication of serving cell identification information (e.g., SCell ID) and new beam information (e.g., reference signals). MAC CE based Beam Failure Recovery may enable Beam Failure Recovery enhancements, such as beam failure recovery without initiating RACH procedures and/or by using MAC CEs. The Beam Failure Recovery enhancements enable devices (e.g., UEs and base stations) of a network to perform Beam Failure Recovery operations more quickly and more reliably, which reduces latency and increases throughput. The Beam Failure Recovery enhancements may enable operation in ultra-reliable low latency communication modes (URLLC), such as enhanced URLLC (eU-RLLC).

The detailed description set forth below, in connection with the appended drawings, is intended as a description of various configurations and is not intended to limit the scope of the disclosure. Rather, the detailed description includes specific details for the purpose of providing a thorough understanding of the inventive subject matter. It will be apparent to those skilled in the art that these specific details are not required in every case and that, in some instances, well-known structures and components are shown in block diagram form for clarity of presentation.

This disclosure relates generally to providing or participating in communication as between two or more wireless devices in one or more wireless communications systems, also referred to as wireless communications networks. In various embodiments, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carder FDMA (SC-FDMA) networks, LTE networks, GSM networks, $5^{th}$ Generation (5G) or new radio (NR) networks (sometimes referred to as "5G NR" networks/systems/devices), as well as other communications networks. As described herein, the terms "networks" and "systems" may be used interchangeably.

A CDMA network, for example, may implement a radio technology such as universal terrestrial radio access (UTRA), cdma2000, and the like. UTRA includes wideband-CDMA (W-CDMA) and low chip rate (LCR). CDMA2000 covers IS-2000, IS-95, and IS-856 standards.

A TDMA network may, for example implement a radio technology such as GSM. 3GPP defines standards for the GSM EDGE (enhanced data rates for GSM evolution) radio access network (RAN), also denoted as GERAN. GERAN is the radio component of GSM/EDGE, together with the network that joins the base stations (for example, the Ater and Abis interfaces) and the base station controllers (A interfaces, etc.). The radio access network represents a component of a GSM network, through which phone calls and packet data are routed from and to the public switched telephone network (PSTN) and Internet to and from subscriber handsets, also known as user terminals or user equipments (UEs). A mobile phone operator's network may comprise one or more GERANs, which may be coupled with Universal Terrestrial Radio Access Networks (UTRANs) in the case of a UMTS/GSM network. An operator network may also include one or more LTE networks, and/or one or more other networks. The various different network types may use different radio access technologies (RATs) and radio access networks (RANs).

An OFDMA network may implement a radio technology such as evolved UTRA (E-UTRA), IEEE 802.11, IEEE 802.16, IEEE 802.20, flash-OFDM and the like. UTRA, E-UTRA, and Global System for Mobile Communications (GSM) are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3rd Generation Partnership Project (3GPP) is a collaboration between groups of telecommunications associations that aims to define a globally applicable third generation (3G) mobile phone specification. 3GPP long term evolution (LTE) is a 3GPP project which was aimed at improving the universal mobile telecommunications system (UMTS) mobile phone standard. The 3GPP may define specifications for the next generation of mobile networks, mobile systems, and mobile devices. The present disclosure is concerned with the evolution of wireless technologies from LTE, 4G, 5G, NR, and beyond with shared access to wireless spectrum between networks using a collection of new and different radio access technologies or radio air interfaces.

5G networks contemplate diverse deployments, diverse spectrum, and diverse services and devices that may be implemented using an OFDM-based unified, air interface. To achieve these goals, further enhancements to LTE and LTE-A are considered in addition to development of the new radio technology for 5G NR networks. The 5G NR will be capable of scaling to provide coverage (1) to a massive Internet of things (IoTs) with an ultra-high density (e.g., ~1 M nodes/km$^2$), ultra-low complexity (e.g., ~10 s of bits/sec), ultra-low energy (e.g., ~10+ years of battery life), and deep coverage with the capability to reach challenging locations; (2) including mission-critical control with strong security to safeguard sensitive personal, financial, or classified information, ultra-high reliability (e.g., ~99.9999% reliability), ultra-low latency (e.g., ~1 ms), and users with wide ranges of mobility or lack thereof; and (3) with enhanced mobile broadband including extreme high capacity (e.g., ~10 Tbps/km$^2$), extreme data rates (e.g., multi-Gbps rate, 100+ Mbps user experienced rates), and deep awareness with advanced discovery and optimizations.

5G NR devices, networks, and systems may be implemented to use optimized OFDM-based waveform features. These features may include scalable numerology and transmission time intervals (TTIs); a common, flexible framework to efficiently multiplex services and features with a dynamic, low-latency time division duplex (TDD)/frequency division duplex (FDD) design; and advanced wireless technologies, such as massive multiple input, multiple output (MIMO), robust millimeter wave (mmWave) transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHz FDD/TDD implementations, subcarrier spacing may occur with 15 kHz, for example over 1, 5, 10, 20 MHz, and the like bandwidth. For other various outdoor and small cell coverage deployments of TDD greater than 3 GHz, subcarrier spacing may occur with 30 kHz over 80/100 MHz bandwidth. For other various indoor wideband implementations, using a TDD over the unlicensed portion of the 5 GHz band, the subcarrier spacing may occur with 60 kHz over a 160 MHz bandwidth. Finally, for various deployments transmitting with mmWave components at a TDD of 28 GHz, subcarrier spacing may occur with 120 kHz over a 500 MHz bandwidth.

The scalable numerology of 5G NR facilitates scalable TTI for diverse latency and quality of service (QoS) requirements. For example, shorter TTI may be used for low latency and high reliability, while longer TTI may be used for higher spectral efficiency. The efficient multiplexing of long and short TTIs to allow transmissions to start on symbol boundaries. 5G NR also contemplates a self-contained integrated subframe design with uplink/downlink scheduling information, data, and acknowledgement in the same subframe. The self-contained integrated subframe supports communications in unlicensed or contention-based shared spectrum, adaptive uplink/downlink that may be flexibly configured on a per-cell basis to dynamically switch between uplink and downlink to meet the current traffic needs.

For clarity, certain aspects of the apparatus and techniques may be described below with reference to exemplary LTE implementations or in an LTE-centric way, and LTE terminology may be used as illustrative examples in portions of the description below; however, the description is not intended to be limited to LTE applications. Indeed, the present disclosure is concerned with shared access to wireless spectrum between networks using different radio access technologies or radio air interfaces, such as those of 5G NR.

Moreover, it should be understood that, in operation, wireless communication networks adapted according to the concepts herein may operate with any combination of licensed or unlicensed spectrum depending on loading and availability. Accordingly, it will be apparent to one of skill in the art that the systems, apparatus and methods described herein may be applied to other communications systems and applications than the particular examples provided.

While aspects and embodiments are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, embodiments and/or uses may come about via integrated chip embodiments and/or other non-module-component based devices (e.g., end-user devices, vehicles, communication devices, computing devices, industrial equipment, retail/purchasing devices, medical devices, AI-enabled devices, etc.). While some examples may or may not be specifically directed to use cases or applications, a wide assortment of applicability of described innovations may occur. Implementations may range from chip-level or modular components to non-modular, non-chip-level implementations and further to aggregated, distributed, or OEM devices or systems incorporating one or more described aspects. In some practical settings, devices incorporating described aspects and features may also necessarily include additional components and features for implementation and practice of claimed and described embodiments. It is intended that innovations described herein may be practiced in a wide variety of implementations, including both large/small devices, chip-level components, multi-component systems (e.g. RF-chain, communication interface, processor), distributed arrangements, end-user devices, etc. of varying sizes, shapes, and constitution.

FIG. 1 shows wireless network 100 for communication according to some embodiments. Wireless network 100 may, for example, comprise a 5G wireless network. As appreciated by those skilled in the art, components appearing in FIG. 1 are likely to have related counterparts in other network arrangements including, for example, cellular-style network arrangements and non-cellular-style-network arrangements (e.g., device to device or peer to peer or ad hoc network arrangements, etc.).

Wireless network 100 illustrated in FIG. 1 includes a number of base stations 105 and other network entities. A base station may be a station that communicates with the UEs and may also be referred to as an evolved node B (eNB), a next generation eNB (gNB), an access point, and the like. Each base station 105 may provide communication coverage for a particular geographic area. In 3GPP, the term "cell" can refer to this particular geographic coverage area of a base station and/or a base station subsystem serving the coverage area, depending on the context in which the term is used. In implementations of wireless network 100 herein, base stations 105 may be associated with a same operator or different operators (e.g., wireless network 100 may comprise a plurality of operator wireless networks), and may provide wireless communications using one or more of the same frequencies (e.g., one or more frequency bands in licensed spectrum, unlicensed spectrum, or a combination thereof) as a neighboring cell. In some examples, an individual base station 105 or UE 115 may be operated by more than one network operating entity. In other examples, each base station 105 and UE 115 may be operated by a single network operating entity.

A base station may provide communication coverage for a macro cell or a small cell, such as a pico cell or a femto cell, and/or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A base station for a macro cell may be referred to as a macro base station. A base station for a small cell may be referred to as a small cell base station, a pico base station, a femto base station or a home base station. In the example shown in FIG. 1, base stations 105d and 105e are regular macro base stations, while base stations 105a-105c are macro base stations enabled with one of 3 dimension (3D), full dimension (FD), or massive MIMO. Base stations 105a-105c take advantage of their higher dimension MIMO capabilities to exploit 3D beamforming in both elevation and azimuth beamforming to increase coverage and capacity. Base station 105f is a small cell base station which may be a home node or portable access point. A base station may support one or multiple (e.g., two, three, four, and the like) cells.

Wireless network 100 may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. In some scenarios, networks may be enabled or configured to handle dynamic switching between synchronous or asynchronous operations.

UEs 115 are dispersed throughout the wireless network 100, and each UE may be stationary or mobile. It should be appreciated that, although a mobile apparatus is commonly referred to as user equipment (UE) in standards and specifications promulgated by the 3rd Generation Partnership Project (3GPP), such apparatus may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. Within the present document, a "mobile" apparatus or UE need not necessarily have a capability to move, and may be stationary. Some non-limiting examples of a mobile apparatus, such as may comprise embodiments of one or more of UEs 115, include a mobile, a cellular (cell) phone, a smart phone, a session initiation protocol (SIP) phone, a wireless local loop (WLL) station, a laptop, a personal computer (PC), a notebook, a netbook, a smart book, a tablet, and a personal digital assistant (PDA). A mobile apparatus may additionally be an "Internet of things" (IoT) or "Internet of everything" (IoE) device such as an automotive or other transportation vehicle, a satellite radio, a global positioning system (GPS) device, a logistics controller, a drone, a multi-copter, a quad-copter, a smart energy or security device, a solar panel or solar array, municipal lighting, water, or other infrastructure; industrial automation and enterprise devices; consumer and wearable devices, such as eyewear, a wearable camera, a smart watch, a health or fitness tracker, a mammal implantable device, gesture tracking device, medical device, a digital audio player (e.g., MP3 player), a camera, a game console, etc.; and digital home or smart home devices such as a home audio, video, and multimedia device, an appliance, a sensor, a vending machine, intelligent lighting, a home security system, a smart meter, etc. In one aspect, a UE may be a device that includes a Universal Integrated Circuit Card (UICC). In another aspect, a UE may be a device that does not include a UICC. In some aspects, UEs that do not include UICCs may also be referred to as IoE devices. UEs 115a-115d of the embodiment illustrated in FIG. 1 are examples of mobile smart phone-type devices accessing wireless network 100 A UE may also be a machine specifically configured for connected communication, including machine type communication (MTC), enhanced MTC (eMTC), narrowband IoT (NB-IoT) and the like. UEs 115e-115k illustrated in FIG. 1 are examples of various machines configured for communication that access wireless network 100.

A mobile apparatus, such as UEs 115, may be able to communicate with any type of the base stations, whether macro base stations, pico base stations, femto base stations, relays, and the like. In FIG. 1, a lightning bolt (e.g., communication link) indicates wireless transmissions between a UE and a serving base station, which is a base station designated to serve the UE on the downlink and/or uplink, or desired transmission between base stations, and backhaul transmissions between base stations. Backhaul communication between base stations of wireless network 100 may occur using wired and/or wireless communication links.

In operation at wireless network 100, base stations 105a-105c serve UEs 115a and 115b using 3D beamforming and coordinated spatial techniques, such as coordinated multi-point (CoMP) or multi-connectivity. Macro base station 105d performs backhaul communications with base stations 105a-105c, as well as small cell, base station 105f. Macro base station 105d also transmits multicast services which are subscribed to and received by UEs 115c and 115d. Such multicast services may include mobile television or stream video, or may include other services for providing community information, such as weather emergencies or alerts, such as Amber alerts or gray alerts.

Wireless network 100 of embodiments supports mission critical communications with ultra-reliable and redundant links for mission critical devices, such UE 115e, which is a drone. Redundant communication links with UE 115e include from macro base stations 105d and 105e, as well as small cell base station 105f. Other machine type devices, such as UE 115f (thermometer), UE 115g (smart meter), and UE 115h (wearable device) may communicate through wireless network 100 either directly with base stations, such as small cell base station 105f, and macro base station 105e, or in multi-hop configurations by communicating with another user device which relays its information to the network, such as UE 115f communicating temperature measurement information to the smart meter, UE 115g, which is then reported to the network through small cell base station 105f. Wireless network 100 may also provide additional network efficiency through dynamic, low-latency TDD/FDD communications, such as in a vehicle-to-vehicle (V2V) mesh network between UEs 115i-115k communicating with macro base station 105e.

Figure 2:
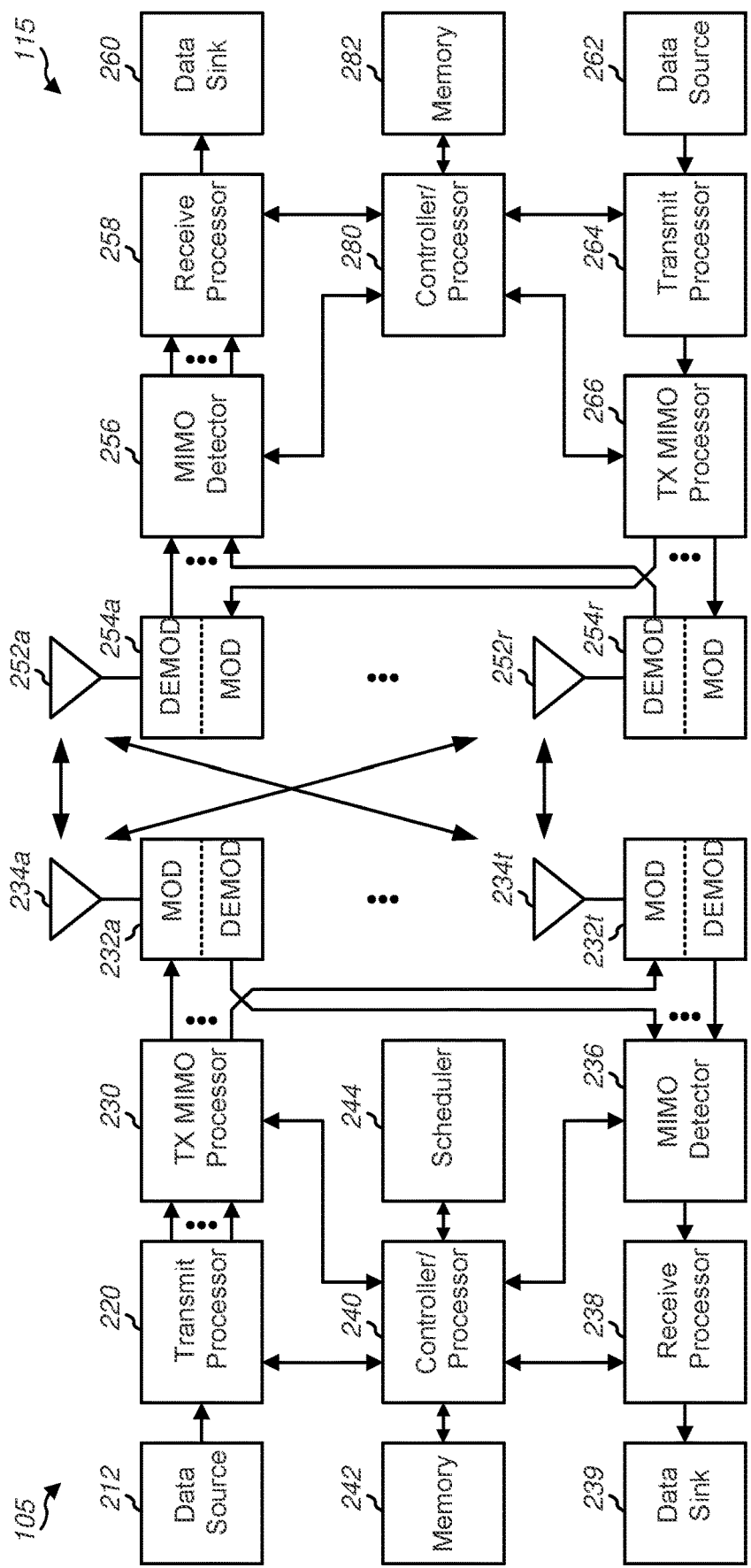
FIG. 2 is a block diagram conceptually illustrating a design of a base station and a UE configured according to some embodiments of the present disclosure.

FIG. 2 shows a block diagram of a design of a base station 105 and a UE 115, which may be any of the base stations and one of the UEs in FIG. 1. For a restricted association scenario (as mentioned above), base station 105 may be small cell base station 105f in FIG. 1, and UE 115 may be UE 115c or 115D operating in a service area of base station 105f, which in order to access small cell base station 105f, would be included in a list of accessible UEs for small cell base station 105f. Base station 105 may also be a base station of some other type. As shown in FIG. 2, base station 105 may be equipped with antennas 234a through 234t, and UE 115 may be equipped with antennas 252a through 252r for facilitating wireless communications.

At the base station 105, a transmit processor 220 may receive data from a data source 212 and control information from a controller/processor 240. The control information may be for the physical broadcast channel (PBCH), physical control format indicator channel (PCFICH), physical hybrid-ARQ (automatic repeat request) indicator channel (PHICH), physical downlink control channel (PDCCH), enhanced physical downlink control channel (EPDCCH), MTC physical downlink control channel (MPDCCH), etc. The data may be for the PDSCH, etc. The transmit processor 220 may process (e.g., encode and symbol map) the data and control information to obtain data symbols and control symbols, respectively. The transmit processor 220 may also generate reference symbols, e.g., for the primary synchronization signal (PSS) and secondary synchronization signal (SSS), and cell-specific reference signal. Transmit (TX) multiple-input multiple-output (MIMO) processor 230 may perform spatial processing (e.g., precoding) on the data symbols, the control symbols, and/or the reference symbols, if applicable, and may provide output symbol streams to modulators (MODs) 232a through 232t. Each modulator 232 may process a respective output symbol stream (e.g., for OFDM, etc.) to obtain an output sample stream. Each modulator 232 may additionally or alternatively process (e.g., convert to analog, amplify, filter, and upconvert) the output sample stream to obtain a downlink signal. Downlink signals from modulators 232a through 232t may be transmitted via the antennas 234a through 234t, respectively.

At the UE 115, the antennas 252a through 252r may receive the downlink signals from the base station 105 and may provide received signals to the demodulators (DEMODs) 254a through 254r, respectively. Each demodulator 254 may condition (e.g., filter, amplify, downconvert, and digitize) a respective received signal to obtain input samples. Each demodulator 254 may further process the input samples (e.g., for OFDM, etc.) to obtain received symbols. MIMO detector 256 may obtain received symbols from demodulators 254a through 254r, perform MIMO detection on the received symbols if applicable, and provide detected symbols. Receive processor 258 may process (e.g., demodulate, deinterleave, and decode) the detected symbols, provide decoded data for the UE 115 to a data sink 260, and provide decoded control information to a controller/processor 280.

On the uplink, at the UE 115, a transmit processor 264 may receive and process data (e.g., for the physical uplink shared channel (PUSCH)) from a data source 262 and control information (e.g., for the physical uplink control channel (PUCCH)) from the controller/processor 280. Transmit processor 264 may also generate reference symbols for a reference signal. The symbols from the transmit processor 264 may be precoded by TX MIMO processor 266 if applicable, further processed by the modulators 254a through 254r (e.g., for SC-FDM, etc.), and transmitted to the base station 105. At base station 105, the uplink signals from UE 115 may be received by antennas 234, processed by demodulators 232, detected by MIMO detector 236 if applicable, and further processed by receive processor 238 to obtain decoded data and control information sent by UE 115. Processor 238 may provide the decoded data to data sink 239 and the decoded control information to controller/processor 240.

Controllers/processors 240 and 280 may direct the operation at base station 105 and UE 115, respectively. Controller/processor 240 and/or other processors and modules at base station 105 and/or controller/processor 280 and/or other processors and modules at UE 115 may perform or direct the execution of various processes for the techniques described herein, such as to perform or direct the execution illustrated in FIGS. 19 and 20, and/or other processes for the techniques described herein. Memories 242 and 282 may store data and program codes for base station 105 and UE 115, respectively. Scheduler 244 may schedule UEs for data transmission on the downlink and/or uplink.

Wireless communications systems operated by different network operating entities (e.g., network operators) may share spectrum. In some instances, a network operating entity may be configured to use an entirety of a designated shared spectrum for at least a period of time before another network operating entity uses the entirety of the designated shared spectrum for a different period of time. Thus, in order to allow network operating entities use of the full designated shared spectrum, and in order to mitigate interfering communications between the different network operating entities, certain resources (e.g., time) may be partitioned and allocated to the different network operating entities for certain types of communication.

For example, a network operating entity may be allocated certain time resources reserved for exclusive communication by the network operating entity using the entirety of the shared spectrum. The network operating entity may also be allocated other time resources where the entity is given priority over other network operating entities to communicate using the shared spectrum. These time resources, prioritized for use by the network operating entity, may be utilized by other network operating entities on an opportunistic basis if the prioritized network operating entity does not utilize the resources. Additional time resources may be allocated for any network operator to use on an opportunistic basis.

Access to the shared spectrum and the arbitration of time resources among different network operating entities may be centrally controlled by a separate entity, autonomously determined by a predefined arbitration scheme, or dynamically determined based on interactions between wireless nodes of the network operators.

In some cases, UE 115 and base station 105 may operate in a shared radio frequency spectrum band, which may include licensed or unlicensed (e.g., contention-based) frequency spectrum. In an unlicensed frequency portion of the shared radio frequency spectrum band, UEs 115 or base stations 105 may traditionally perform a medium-sensing procedure to contend for access to the frequency spectrum. For example, UE 115 or base station 105 may perform a listen before talk (LBT) procedure such as a clear channel assessment (CCA) prior to communicating in order to determine whether the shared channel is available. A CCA may include an energy detection procedure to determine whether there are any other active transmissions. For example, a device may infer that a change in a received signal strength indicator (RSSI) of a power meter indicates that a channel is occupied. Specifically, signal power that is concentrated in a certain bandwidth and exceeds a predetermined noise floor may indicate another wireless transmitter. A CCA also may include detection of specific sequences that indicate use of the channel. For example, another device may transmit a specific preamble prior to transmitting a data sequence. In some cases, an LBT procedure may include a wireless node adjusting its own backoff window based on the amount of energy detected on a channel and/or the acknowledge/negative-acknowledge (ACK/NACK) feedback for its own transmitted packets as a proxy for collisions.

In 5G networks, control information (for uplink and/or downlink) may be conveyed in a medium access control (MAC) control element (CE) (i.e., in a MAC header) of a physical channel packet (i.e., a data packet or physical channel signal). For example, a UE (e.g., 115) may transmit a MAC CE in a PUCCH or a PUSCH, and a base station (e.g., 105) may transmit a MAC CE in a PDCCH or a PDSCH, i.e., in headers thereof. Additionally, MAC CEs can be transmitted in a payload of a physical channel packet. Examples of control information include information for carrier aggregation and cross carrier repetition, such as a component carrier (CC) identified (ID, CC ID).

5G and NR access technologies provide for beam failure recovery (BFR) operations in response to a beam failure or a determination of a beam failure (e.g., low signal strength). Such conventional beam failure recovery (BFR) operations rely on RACH procedures. However, in conventional operations, there is no way to perform beam failure recovery (e.g., exchange beam failure recovery related control information) via MAC CE. Accordingly, conventional beam failure recovery operations may not take advantage of and utilize MAC CEs to convey control information for beam failure recovery operations (e.g., beam failure recovery requests (BFRQ). Thus, reliability is reduced, latency is increased, and/or MAC CE based beam failure recovery operations are not possible.

Systems and methods described herein are directed to using MAC CEs to convey beam failure recovery (BFR) information. The MAC CEs may be sent along with or in addition to a BFRQ (e.g., as a header thereof or as a separate transmission). In some implementations, MAC CEs may include serving cell identification information (e.g., SCell ID) and/or new beam information (e.g., reference signal, such as SSB or NZP CSI-RS). In a particular implementation, the MAC CEs may include serving cell identification information for multiple serving cells. In such implementations when the MAC CEs may include serving cell identification information (e.g., secondary serving (SCell) index information, such as SCell ID) for multiple serving cells, the MAC CEs may have a grouped or interleaved configuration for the corresponding pairs of serving cell identification information and new beam information. Additionally or alternatively, MAC CEs may not include new beam information (e.g., not include a field or fields for the new beam information) for one or more serving cells. In such implementations, MAC CEs may include one or more indicators to indicate if a field is present, a type of field present, or both.

In addition to or in the alternative of, bandwidth part information (e.g., BWP ID) may be included in a BFR MAC CE. A BWP ID field or fields may be included in a MAC CE, such as in a grouped or interleaved configuration. The BWP ID can be utilized in or with any of the foregoing implementations.

The systems and methods described herein enable exchanging beam failure request control information via MAC CEs. Such use of MAC CEs to exchange beam failure request control information may enable higher reliability and reduced latency, such as when recovering from beam failure or alleviating poor channel conditions (e.g., interference blockage, weak signal, etc.). Accordingly, such systems and methods can be utilized for URLLC communications, such as eURLLC.

Figure 3:
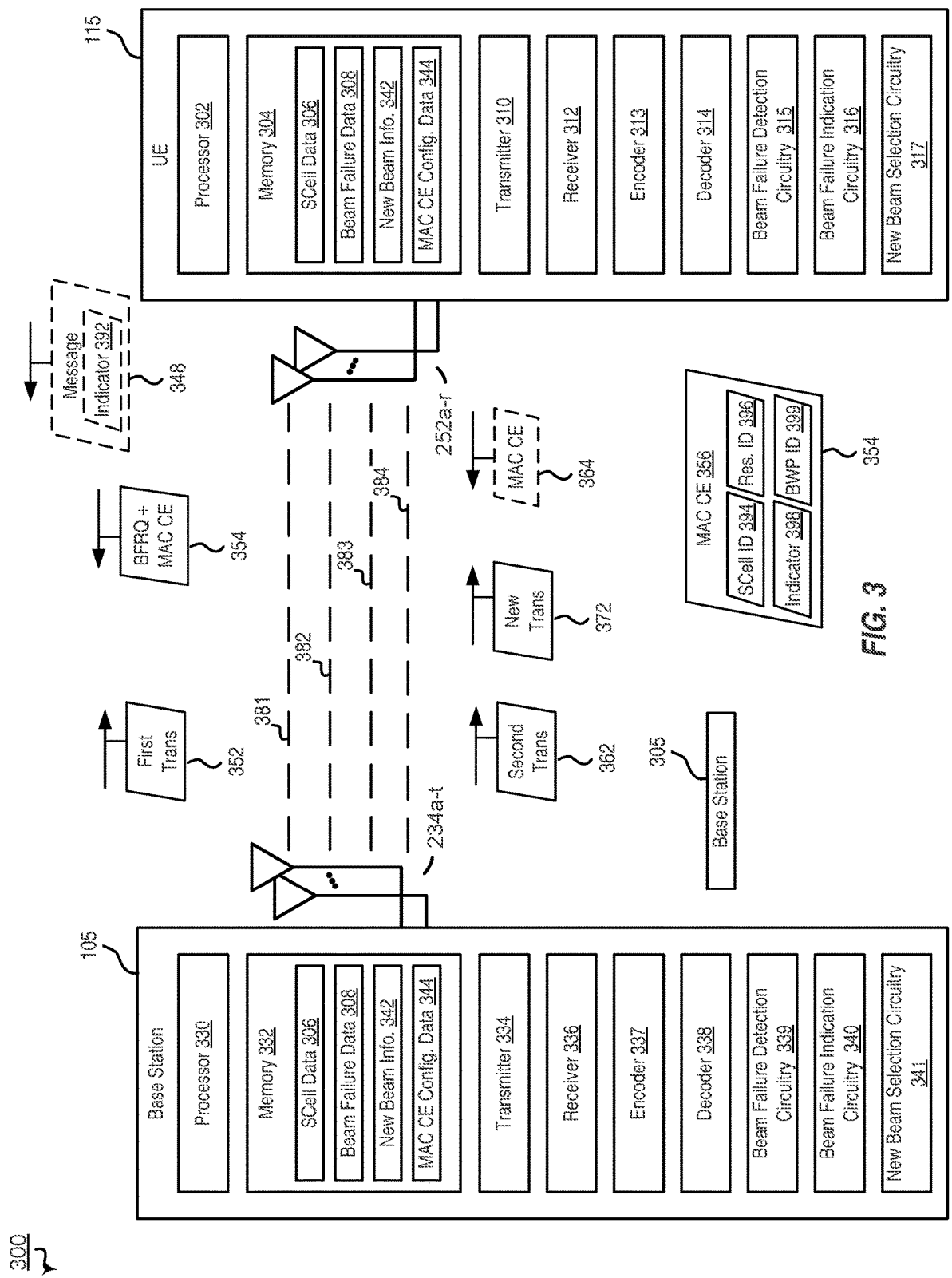
FIG. 3 is a block diagram illustrating an example of a wireless communications system that enables Beam Failure Recovery in accordance with aspects of the present disclosure.

FIG. 3 illustrates an example of a wireless communications system 300 that supports using MAC CEs to convey beam failure recovery (BFR) information in accordance with aspects of the present disclosure. In some examples, wireless communications system 300 may implement aspects of wireless communication system 100. For example, wireless communications system 300 may include UE 115 and base station 105. Although one UE and one base station are illustrated, in other implementations, wireless communications system 300 may include multiple UEs 115, multiple base stations 105, or both, such as second base station 305. BFR MAC CEs may enable reduced overhead and latency when performing BFR operations and thus may increase throughput and reduce latency.

Base stations 105, 305 and UE 115 may be configured to communicate via frequency bands, such as FR1 having a frequency of 450 to 6000 MHz for Sub-6 GHz or FR2 having a frequency of 24250 to 2600 MHz for mm-Wave. It is noted that sub-carrier spacing (SCS) may be equal to 15, 30, 60, or 120 kHz for some data channels. Base stations 105, 305 and UE 115 may be configured to communicate via one or more component carriers (CCs), such as representative first CC 381, second CC 382, third CC 383, and fourth CC 384. Although four CCs are shown, this is for illustration only, more or fewer than four CCs may be used. One or more CCs may be used to communicate a Physical Downlink Control Channel (PDCCH), a Physical Downlink Shared Channel (PDSCH), a Physical Uplink Control Channel (PUCCH), or a Physical Uplink Shared Channel (PUSCH). In some implementations, such transmissions may be scheduled by dynamic grants or periodic grants (e.g., configured grants or SPS).

Each CC may have a corresponding configuration, such as configuration parameters/settings. The configuration may include bandwidth, bandwidth part, HARQ process, TCI state, RS, control channel resources, data channel resources, or a combination thereof. Additionally, or alternatively, one or more CCs may have or be assigned to a Cell ID, a Bandwidth Part (BWP) ID, or both. The Cell ID may include a unique cell ID for the CC, a virtual Cell ID, or a particular Cell ID of a particular CC of the plurality of CCs. Additionally, or alternatively, one or more CCs may have or be assigned to a HARQ ID. Each CC may also have corresponding management functionalities, such as, beam management, BWP switching functionality, or both.

In some implementations, two or more CCs are quasi co-located, such that the CCs have the same beam and/or same symbol. Additionally, or alternatively, CCs may be grouped as a set of one or more CCs, such as a cross carrier CORESET. Each CC in a CORESET may have the same cell ID, the same HARQ ID, or both.

In some implementations, control information may be communicated via base station 105 and UE 115 and/or base station 305 and UE 115. For example, the control information may be communicated suing MAC CE transmissions, RRC transmissions, DCI, transmissions, another transmission, or a combination thereof.

UE 115 includes processor 302, memory 304, transmitter 310, receiver 312, encoder, 313, decoder 314, beam failure detection circuitry 315, beam failure indication circuitry 316, new beam selection circuitry 317, and antennas 252a-r. Processor 302 may be configured to execute instructions stored at memory 304 to perform the operations described herein. In some implementations, processor 302 includes or corresponds to controller/processor 280, and memory 304 includes or corresponds to memory 282. Memory 304 may also be configured to store serving cell identification information (such as SCell ID data 306), beam failure data 308, new beam information 342, MAC CE configuration data 344, or a combination thereof, as further described herein.

The serving cell identification information may include or correspond to an serving cell ID index or a listing of serving cell IDs for serving cells. In the example of FIG. 3, the SCell ID data 306 may include or correspond to an SCell ID index or listing of SCell IDs for secondary serving cells. The serving cell identification information (e.g., SCell ID data 306) may be transmitted by MAC CE, and may be included in a MAC CE as illustrated in FIGS. 4-18. Beam failure data 308 may include or correspond to data and thresholds for determining beam failure and when to initiate beam failure recovery operations. For example, beam failure data 308 may include a history of beam failures, a history of beam failure recoveries, beam failure data for recent or current transmissions, channel conditions, signal strength, etc., or a combination thereof.

New beam information 342 may include or correspond to information on settings or parameters for a new transmission or transmissions corresponding to a determined beam failure. New beam information 342 may include reference signals or reference signal information, as illustrative, non-limiting examples. MAC CE configuration data 344 may include or correspond to information on a structure or layout of fields of a MAC CE, such as BFR MAC CE. Such MAC CE configuration data may enable UE to generate a BFR MAC CE and may include or correspond to information which indicates a layout of a MAC CE, such as the exemplary layouts illustrated in FIGS. 4-18.

Transmitter 310 is configured to transmit data to one or more other devices, and receiver 312 is configured to receive data from one or more other devices. For example, transmitter 310 may transmit data, and receiver 312 may receive data, via a network, such as a wired network, a wireless network, or a combination thereof. For example, UE 115 may be configured to transmit and/or receive data via a direct device-to-device connection, a local area network (LAN), a wide area network (WAN), a modem-to-modem connection, the Internet, intranet, extranet, cable transmission system, cellular communication network, any combination of the above, or any other communications network now known or later developed within which permits two or more electronic devices to communicate. In some implementations, transmitter 310 and receiver 312 may be replaced with a transceiver. Additionally, or alternatively, transmitter 310, receiver, 312, or both may include or correspond to one or more components of UE 115 described with reference to FIG. 2. Encoder 313 and decoder 314 may be configured to encode and decode, such as jointly encode and jointly decode, respectively.

Base station 105 includes processor 330, memory 332, transmitter 334, receiver 336, encoder 337, decoder 338, beam failure detection circuitry 339, beam failure indication circuitry 340, new beam selection circuitry 341, and antennas 234a-t. Processor 330 may be configured to execute instructions stores at memory 332 to perform the operations described herein. In some implementations, processor 330 includes or corresponds to controller/processor 240, and memory 332 includes or corresponds to memory 242. Memory 332 may be configured to store SCell ID data 306, beam failure data 308, new beam information 342, MAC CE configuration data 344, or a combination thereof, similar to the UE 115 and as further described herein.

Transmitter 334 is configured to transmit data to one or more other devices, and receiver 336 is configured to receive data from one or more other devices. For example, transmitter 334 may transmit data, and receiver 336 may receive data, via a network, such as a wired network, a wireless network, or a combination thereof. For example, base station 105 may be configured to transmit and/or receive data via a direct device-to-device connection, a local area network (LAN), a wide area network (WAN), a modem-to-modem connection, the Internet, intranet, extranet, cable transmission system, cellular communication network, any combination of the above, or any other communications network now known or later developed within which permits two or more electronic devices to communicate. In some implementations, transmitter 334 and receiver 336 may be replaced with a transceiver. Additionally, or alternatively, transmitter 334, receiver, 336, or both may include or correspond to one or more components of base station 105 described with reference to FIG. 2. Encoder 337, decoder 338, beam failure detection circuitry 339, beam failure indication circuitry 340, and new beam selection circuitry 341 may include the same functionality as described with reference to encoder 313, decoder 314, beam failure detection circuitry 315, beam failure indication circuitry 316, and new beam selection circuitry 317, respectively. Base station 305 may include the same components as base station 105.

During operation of wireless communications system 300, base station 105 may determine that UE 115 has BFR MAC CE capability. For example, UE 115 may transmit a first message 348 that includes a capability indicator. As illustrated in FIG. 3, the first message 348 includes an indicator 392. Indicator 392 may indicate a capability and/or configuration for BFR MAC CE capability, such as a MAC CE layout. In some implementations, base station 105 sends control information to indicate to UE 115 that MAC CE are to be used in BFR operations. For example, in some implementations, a message that includes indicator 392 is transmitted by the base station 105.

After transmission of the first message 348 (e.g., a MAC CE configuration message, such as a RRC message or a DCI), transmissions may be scheduled by the base station 105, the UE 115, or both. Such scheduled transmissions may include shared channel transmissions, such as PDSCH and/or PUSCH. These scheduled transmissions may include or correspond to dynamic or periodic transmissions.

Base station 105 may transmit a first transmission 352 (e.g., PDSCH) via first CC 381 and may transmit a second transmission 362 (e.g., PDSCH) via second CC 382. UE 115 monitors for the transmissions 352 and 362. In other implementations, base station 305 may transmit the second transmission 362. UE may receive or not receive the transmissions 352 and 362 or may or may not successfully decode the transmissions 352 and 362. In response to a failed transmission or a transmission or channel parameter meeting a condition (e.g., signal strength lower than a threshold), UE 115 determines a beam failure for the transmission. For example, responsive to a failure of first transmission 352 from base station 105 or to channel conditions deteriorating, UE 115 determines a serving Cell ID corresponding to the first transmission 352 and/or base station 105. UE 115 sends a beam failure recovery request (BFRQ); sends a MAC CE (e.g., BFR MAC CE).

The BFRQ and MAC CE may be sent in the same transmission, such as transmission 354 as illustrated in FIG. 3, or in different transmissions (e.g., 354 and 364). When sent with the BFRQ, the MAC CE may be a header or preamble of the transmission (e.g., 354). When sent separately from the BFRQ, such as in a second, separate transmission 364, the MAC CE may be a header or preamble of the separate transmission or part of the payload of the separate transmission. The MAC CE may be transmitted with other MAC CEs, such as other types of MAC CEs or other BFR MAC CEs. In a particular implementation, the MAC CE is sent via a PUSCH.

Figure 4:
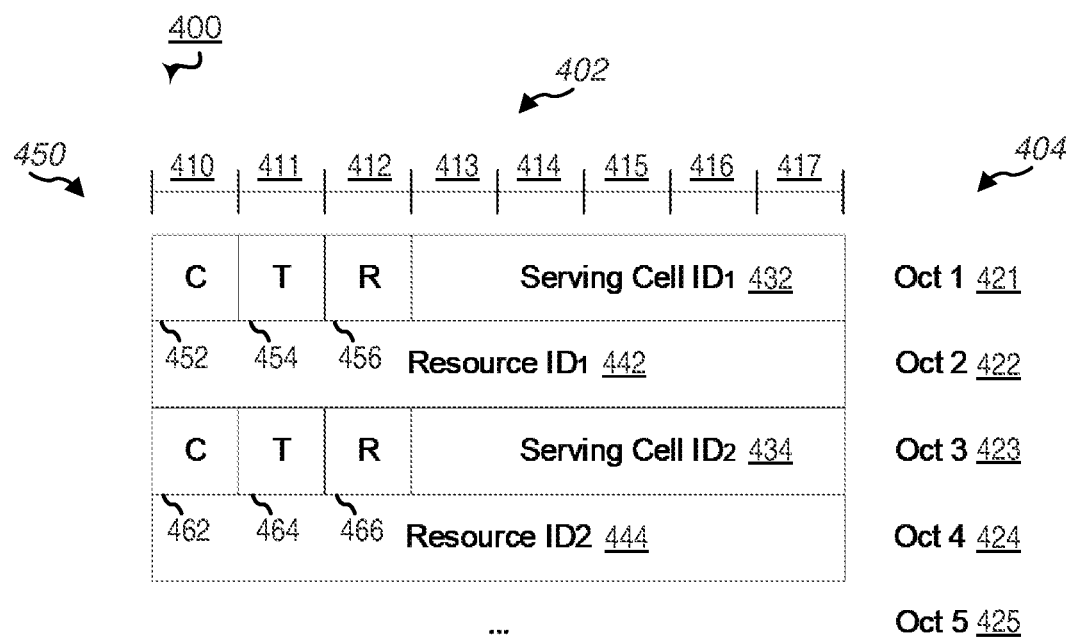

The MAC CE may include SCell ID data 306 indicating the serving cell and may include new beam information 342 indicating new transmission settings and parameters, as described with reference to FIGS. 4-18. The MAC CE may have a layout or structure as indicated by MAC CE configuration data 344, such as one of the illustrative example configurations of FIGS. 4-18 An exemplary MAC CE 356 is illustrated in FIG. 4. MAC CE 356 includes SCell data 394, resource ID data 396, and indicator(s) 398. The data 394-398 may include or correspond to data for the beam failure recovery request (e.g., BFRQ of 354) for a serving cell associated with the first transmission, the first CC 381, base station 105, or a combination thereof.

In some implementations, MAC CE 356 further includes other information, such as other information for BFR processes or another related process. As an illustrative, non-limiting example, the MAC CE 356 further includes bandwidth part information, such as bandwidth part identification information or active bandwidth part information. The bandwidth part information may indicate an active BWP for a corresponding serving cell (e.g., base station 105) to use when transmitting new data or retransmitting failed data (e.g., 372). In the example of FIG. 3, the bandwidth part information includes BWP ID data 399, which may be optionally included in MAC CE 356. The BWP ID data 399 may be indicated or signaled by indicator(s) 398. For example, the inclusion of BWP ID data 399 in the MAC CE 356 may be indicated or signaled by indicator(s) 398.

The BWP ID indicated by the BWP ID data 399 may be signaled by the base station 115, such as by layer 1 (e.g., physical layer) signaling or by configuration message (e.g., RRC configuration message). The BWP ID indicated by the BWP ID data 399 may correspond to a current active BWP ID for the failed serving cell. Alternatively, the BWP ID may correspond to a detected or determined BWP ID by the base station 115. For example, the base station 115 may determine an improved BWP ID based on beam parameters, as compared to the current active BWP ID.

Base station 105 may receive the BFRQ and MAC CE and may perform BFR operations based on the information of the MAC CE (e.g., 356). Base station 105 may transmit a new transmission 372 (e.g., retransmission of the first transmission 352) using the new beam information of the MAC CE (e.g., Resource ID 396 of MAC CE 356). The new transmission 372 is more likely to be received using the new beam information than simply retransmitting with the same beam information and can overcome blockage and/or interference on a particular channel or for particular settings.

In some implementations, base station 105 may include or correspond to a secondary serving cell of or for UE 115 and second base station 305 may include or correspond to a primary serving cell (PCell) of or for UE 115. In such implementations, the MAC CE 356 may include data for one serving cell (e.g., one secondary serving cell (SCell), such as base station 105). In other implementations, both base stations 105, 305 may include or correspond to a secondary serving cell (SCell) of or for UE 115. In such implementations, if beam failure recovery is detected for both secondary serving cell (SCells), the MAC CE 356 may include data for multiple serving cells (e.g., both secondary serving cells (SCells), such as base stations 105 and 305).

Thus, FIG. 3 describes using MAC CEs for BFR operations. Using MAC CEs for BFR operations enables a network to reduce latency and overhead and improve reliability when recovering from beam failure. Improving performance when recovering from beam failures may improve throughput for communications on the network and enable use of mm wave frequency ranges and URLLC modes.

Figure 5:
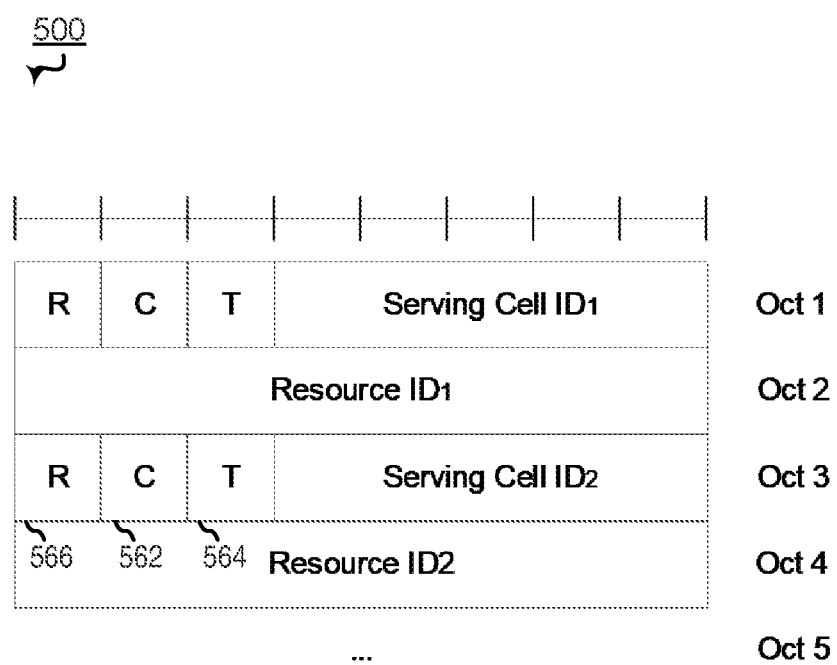
Figure 6:
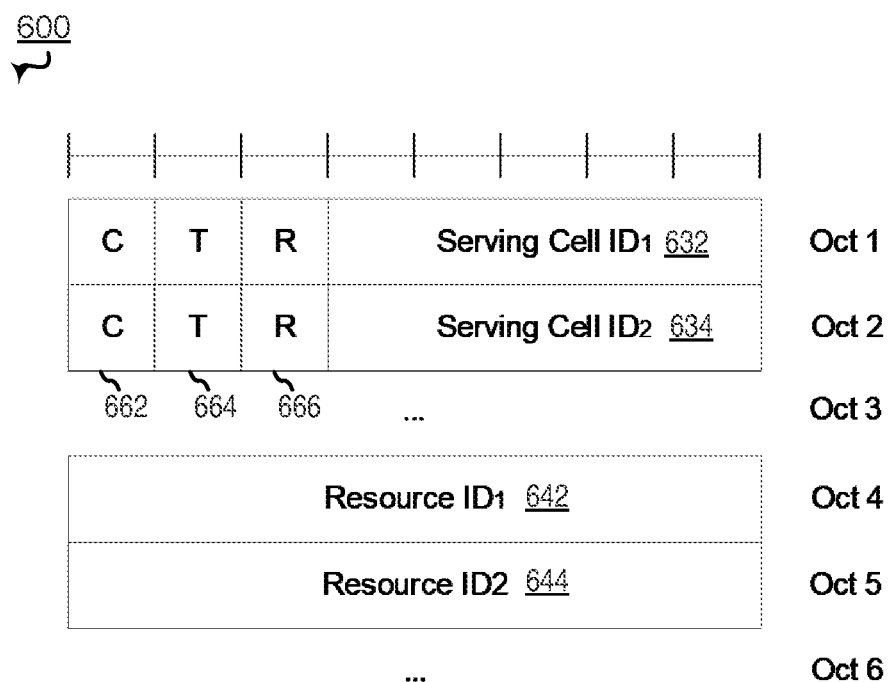
Figure 7:
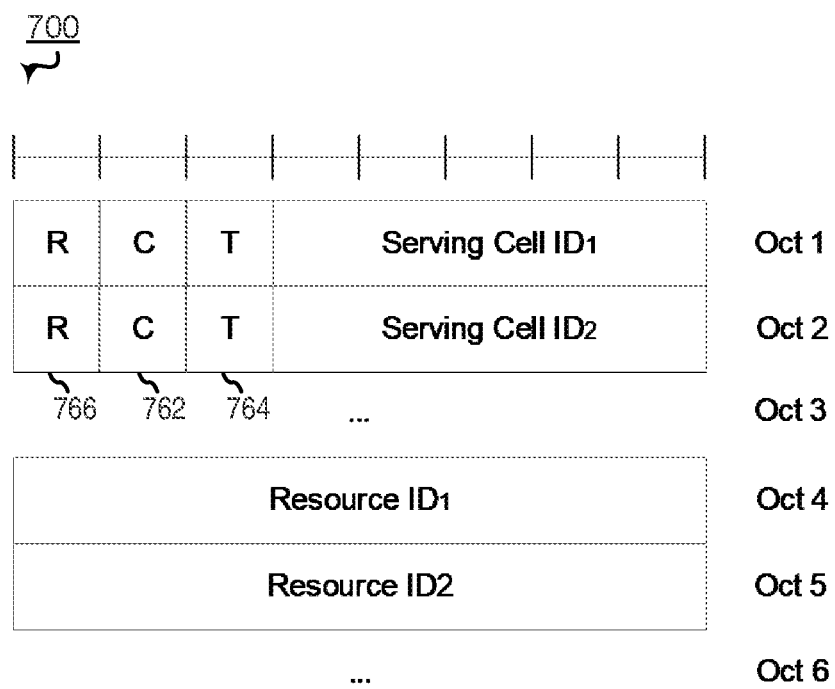
Figure 8:
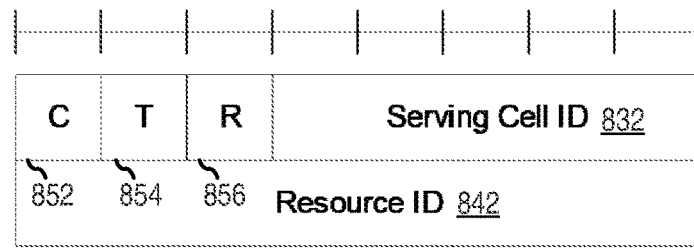
Figure 9:
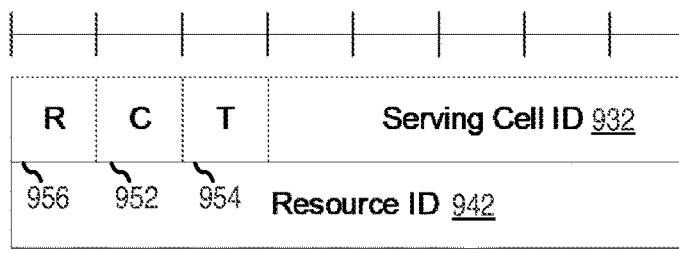
Figure 9:
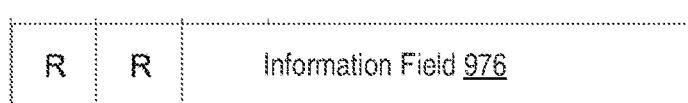
Figure 9:
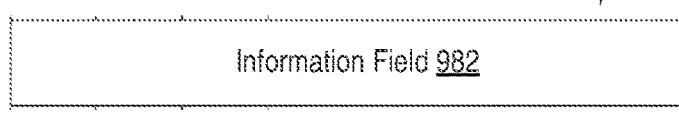

Referring to FIGS. 4-18, examples of field layouts for MAC CEs are illustrated. FIGS. 4-7 illustrate field layouts for MAC CEs which indicate multiple serving cell (e.g., include a single serving cell ID field). FIGS. 4 and 5 illustrate an interleaved layout of serving cell and new beam information, and FIGS. 6 and 7 illustrate a grouped layout for serving cell and new beam information. FIGS. 8 and 9 illustrate field layouts for MAC CEs which indicate a single serving cell (e.g., include a single serving cell ID field). FIGS. 10 and 11 illustrate field layouts for MAC CEs which include multiple types of fields for new beam information (e.g., dedicated resource fields). FIGS. 12 and 13 illustrate field layouts for MAC CEs which selectively include new beam information fields, i.e., may not include any new beam information and/or may not have a one-to-one correspondence between serving cell information and new beam information.

In FIGS. 4-18, the field layouts for the MAC CEs are split up into columns 402 and rows 404, where each row 404 corresponds to an octet (i.e., 8 bits). Each column 402 of the rows 404 indicates a bit of the octet. Each row/octet illustrates 8 bits (bit 0 to bit 7) from left to right, i.e., bits or bit positions 410-417. In FIGS. 4-18, the serving cell information is included in one or more serving cell ID fields. In FIGS. 4-9 the new beam information is included in one or more Resource ID fields. In FIGS. 10 and 11 the new beam information is included in one of two different types of Resource ID fields for a given serving cell. In the examples of FIGS. 10 and 11, the two types of Resource ID fields are SSB Index ID fields and NZP CSI-RS Resource ID fields.

Figure 14:
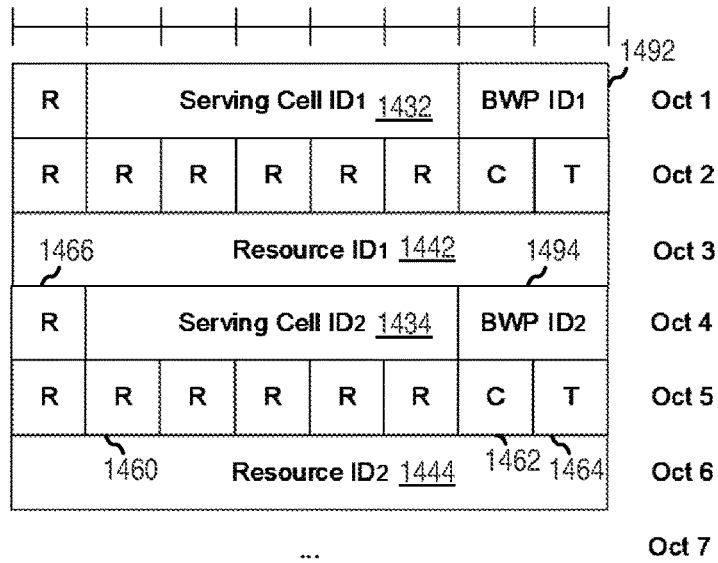
Figure 15:
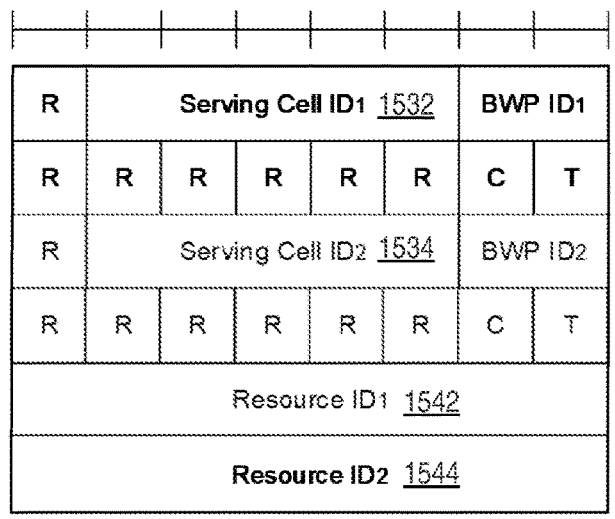
Figure 16:
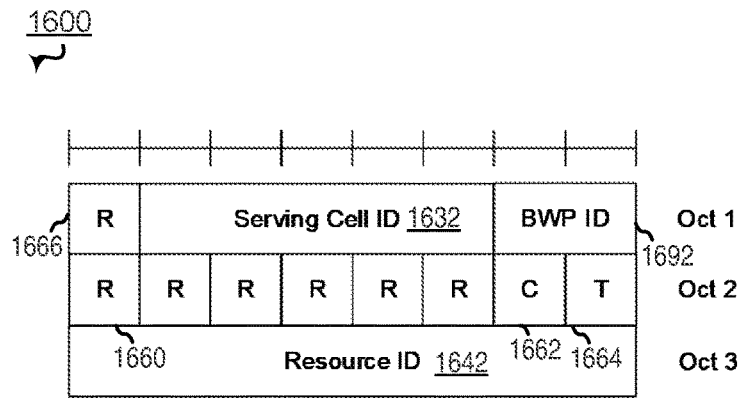
Figure 17:
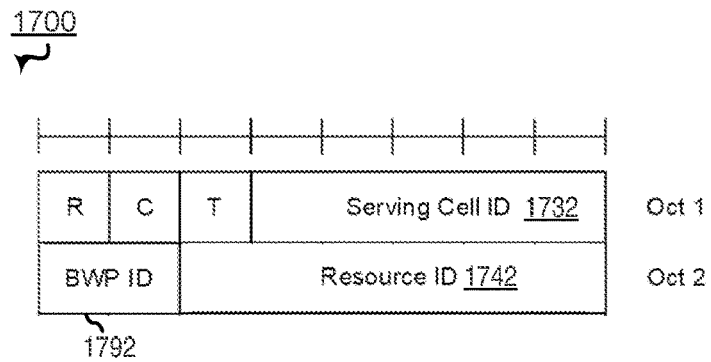
Figure 18:
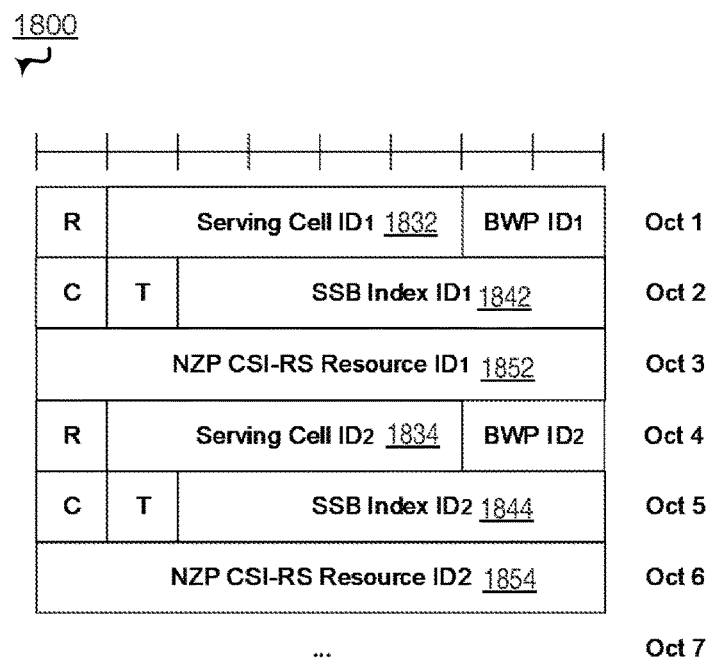

In FIGS. 14-18, the MAC CEs include bandwidth part information (e.g., BWP ID). In the examples of FIGS. 14 and 15, the bandwidth part information is included in MAC CEs that have interleaved and grouped layouts respectively. In the examples of FIGS. 16 and 17, the bandwidth part information is included in MAC CEs that indicate a single serving cell (e.g., include a single serving cell ID field). In FIG. 18, the bandwidth part information is included a MAC CE that has two different types of Resource ID fields for a given serving cell.

In FIGS. 4-18, the MAC CEs include additional fields, reserve bits, or both. The additional fields may be used to convey additional information (e.g., Bandwidth part information, such as BWP ID), information about the structure/ layout and/or length of the MAC CE, or a combination thereof. In the examples of FIGS. 4-18 two different types of fields are illustrated, first fields and second fields. In the examples of FIGS. 4-18 the two different types of fields are configured fields (C) and type fields (T). As illustrative, non-limiting examples, the configured field (C) (or configuration field) may indicate if the new beam information is included in the MAC CE or may indicate whether a new beam information field is included in the MAC CE (a length of the MAC CE). As another illustrative, non-limiting example, the type field (T) may indicate a type of the new beam information, such as type of reference signal (e.g. SSB or NZP CSI-RS). As illustrated in FIGS. 4-18 one or more reserve bits (R) may be included. The reserve bits (or reserved bits) may individually correspond to a reserve field or may be grouped together and jointly correspond to a reserve field Referring to FIG. 4, a first example of a MAC CE configuration is illustrated. In FIG. 4, an example field layout of a MAC CE 400 including serving cell information for multiple serving cells is illustrated. The MAC CE 400 may include or correspond to the MAC CEs of FIG. 3, such as 356. As illustrated in FIG. 4, the MAC CE 400 includes multiple serving cell ID fields and multiple Resource ID fields. To illustrate, MAC CE 400 include a first serving cell ID field 432 and a corresponding first resource ID field 442, and a second serving cell ID field 434 and a corresponding second resource ID field 444. The corresponding resource ID fields 442, 444 include the new beam information for the serving cell. As illustrative, non-limiting examples, the resource ID field (e.g., 432, 434, or both) may include SSB or NZP CSI-RS. The SSB may be a 6 bit value and the NZP CSI-RS may be an 8 bit value. Accordingly, the resource ID field (e.g., 432, 434, or both) may include padding or reserve bits to fill the remaining two bits of the 8 bit field/octet.

In FIG. 4, MAC CE 400 also includes indicator fields and reserve bits 450. As illustrated in the example of FIG. 4, the indicator fields and reserve bits are included in the same octet as the serving cell ID (e.g., 6 bit value) and are positioned in front of the serving cell ID. In the example of FIG. 4, the indicator fields include two types of indicator fields for each serving cell ID field. MAC CE 400 includes a configured field 452, 462, followed by a type field 454, 464, followed by a reserve bit 456, 466. In the example of FIG. 4, the configured fields 452, 462 indicate if the MAC CE 400 is configured to carry include or indicate new beam information (i.e., if the corresponding Resource LD field includes or indicates new beam information).

In the example of FIG. 4, the type field 454, 464 indicates a type of new beam information of the corresponding Resource ID field, when the corresponding configured field 452, 462 indicates that the new beam information is included. In some implementations, a receiving device (e.g., network entity, such as a base station) may ignore a corresponding type field (e.g., 454, 464) when the configured field 452, 462 indicates that the MAC CE 400 is not configured to carry include or indicate new beam information (i.e., if the corresponding Resource ID field does not include or indicate new beam information, such as indicates a null or reserve value, which may be used to indicate another type of information, or can be ignored).

In other implementations, one or more of the indicators and/or reserve bits 450 may have other configurations and or positions, as described further herein. As an illustrative example, one or more of the indicator fields and/or reserve bits may be in another octet and/or after the serving cell ID field. Additionally, or alternatively, the MAC CE 400 may include additional fields or the fields of MAC CE may be rearranged, such as shown in FIGS. 5-18.

Referring to FIG. 5, a second example of a MAC CE configuration is illustrated. In FIG. 5, an example field layout of a MAC CE 500 including serving cell information for multiple serving cells is illustrated. The MAC CE 500 may include or correspond to the MAC CEs of FIG. 3. As compared to FIG. 4, MAC CE 500 includes a different configuration or placement with respect to the indicator fields and reserve bit. In FIG. 5, a reserve bit 566 is positioned in a front of the octet, e.g., first bit. This bit may include or correspond to padding of the MAC CE 500. The order of the indicator fields is not changed, i.e., C before T, in the example of FIG. 5. To illustrate, a reserve bit 566 is positioned in first bit position 410, a configured field 562 is positioned in a second bit position 411, and a type field 564 is positioned in a third bit position 412.

Referring to FIGS. 6 and 7, third and fourth examples of MAC CE configurations with grouped configurations are illustrated. As compared to the interleaved configurations of the first and second examples of MAC CE configurations of FIGS. 4 and 5, the third and fourth examples of MAC CE configurations have a different ordering of fields, i.e., serving cell ID and resource ID fields are grouped together. In FIG. 6, an example field layout of a MAC CE 600 including serving cell information for multiple serving cells is illustrated. The MAC CE 600 may include or correspond to the MAC CEs of FIG. 3. As illustrated in FIG. 6, the MAC CE 600 includes multiple serving cell ID fields in a first portion (e.g., front portion) of the MAC CE, and includes multiple corresponding Resource ID fields grouped together in a second portion (e.g., back portion) of the MAC CE. To illustrate, MAC CE 600 includes first and second serving cell ID fields 632, 634 in a first two octets 421, 422 (e.g., sequential or contiguous octets) and includes corresponding first and second Resource ID fields 642, 644 in two subsequent sequential octets (i.e., fourth and fifth octet 424, 425 in FIG. 6). The configuration and layout of the indicator fields and reserve bit (662-666) correspond to the configuration and layout of the indicator fields and reserve bit (462-466) for FIG. 4.

In FIG. 7, an example field layout of a MAC CE 700 including serving cell information for multiple serving cells is illustrated. The MAC CE 700 may include or correspond to the MAC CEs of FIG. 3. As illustrated in FIG. 7, the MAC CE 700 includes multiple serving cell ID fields in a first portion (e.g., front portion) of the MAC CE, and includes multiple corresponding Resource ID fields grouped together in a second portion (e.g., back portion) of the MAC CE. To illustrate, MAC CE 700 includes first and second serving cell ID fields in a first two octets (e.g., sequential or contiguous octets) and includes corresponding first and second Resource ID fields in two subsequent sequential octets (i.e., fourth and fifth octet in FIG. 7). The configuration and layout of the indicator fields and reserve bit correspond to the configuration and layout of the indicator fields and reserve bit for FIG. 5. To illustrate, a reserve bit 766 is positioned in first bit position 410, a configured field 762 is positioned in a second bit position 411, and a type field 764 is positioned in a third bit position 412.

Referring to FIGS. 8 and 9, fifth and sixth examples of MAC CE configurations are illustrated. In FIG. 8, an example field layout of a MAC CE 800 including serving cell information for a single serving cell is illustrated. The MAC CE 800 may include or correspond to the MAC CEs of FIG. 3. As illustrated in FIG. 8, the MAC CE 800 includes a single serving cell ID field and a single corresponding Resource ID field. To illustrate, MAC CE 800 includes (e.g., consists of) two octets. MAC CE 800 includes a first serving cell ID field 832 in a first octet 421 and a corresponding first resource ID field 842 in a second octet 422. The configuration and layout of the indicator fields and reserve bit (852-856) correspond to the configuration and layout of the indicator fields and reserve bit (452-456) for FIG. 4.

In FIG. 9, an example field layout of a MAC CE 900 including serving cell information for a single serving cell is illustrated. The MAC CE 900 may include or correspond to the MAC CEs of FIG. 3. As illustrated in FIG. 9, the MAC CE 900 includes a single serving cell ID field and a single corresponding Resource ID field. To illustrate, MAC CE 900 includes (e.g., consists of) two octets, similar to MAC CE 800 of FIG. 8. MAC CE 900 includes a first serving cell ID field 932 in a first octet 421 and a corresponding first resource ID field 942 in a second octet 422. The configuration and layout of the indicator fields and reserve bit correspond to the configuration and layout of the indicator fields and reserve bit for FIG. 5. To illustrate, a reserve bit 956 is positioned in first bit position 410, a configured field 952 is positioned in a second bit position 411, and a type field 954 is positioned in a third bit position 412.

Additionally, FIG. 9 depicts two example configurations of an exemplary Resource ID field, first resource ID field 942. As illustrated in FIG. 9, the first resource ID field 942 may have different configurations, examples 970 and 971. In a first example 970, the first resource ID field 942 has a first reserve bit 972, a second reserve bit 974, and a 6 bit information field 976. In a second example 971, the first resource ID field 942 has an 8 bit information field 982. Although the information fields are illustrated as 6 or 8 bits, other lengths may be used, such as fewer than 6 bits, 7 bits, or greater than eight bits. When the information field is less than the resource ID field in bit length, reserve bits may be added as padding. Although the reserve bits are illustrated in the front of the information field, the reserve bits can have any position or positions within the resource ID field. For example, the reserve bits can be behind the information field and/or dispersed within the information field.

Referring to FIGS. 10 and 11, seventh and eighth examples of MAC CE configurations that include multiple fields for new beam information (e.g., multiple types of new beam information fields) are illustrated. In FIG. 10, an example field layout of a MAC CE 1000 including serving cell information for multiple serving cells is illustrated. The MAC CE 1000 may include or correspond to the MAC CEs of FIG. 3. As illustrated in FIG. 10, the MAC CE 1000 includes multiple serving cell ID fields and has an interleaved configuration of serving cell ID fields and corresponding Resource ID fields. MAC CE 1000 include two different types of Resource ID fields, SSB Index and NZP CSI-RS Resource ID, for each serving cell ID field. To illustrate, MAC CE 1000 includes a first serving cell ID field 1032 in a first octet 421 and two corresponding resource ID fields (1042, 1052) in second octet and third octets 422, 423. In the example of FIG. 10, MAC CE 1000 includes a corresponding first type resource ID field 1042 in a second octet 422 and a corresponding second type resource ID field 1052 in a third octet 423 for the first serving cell ID field 1032. MAC CE 1000 also includes a second serving cell ID field 1034 in a fourth octet 424 and a corresponding first type resource ID field 1044 in a fifth octet 425 and a corresponding second type resource ID field 1054 in a sixth octet for the second serving cell ID field 1034.

The configuration and layout of the indicator fields and reserve bits differ from the previous examples. Although, in other implementations, the configuration and layout of the indicator fields and reserve bits may be the same as in previous examples. In the example of FIG. 10, two reserve bits (1066, 1068) are included in first and second bits of the octet where a serving cell ID field is positioned and a configured field 1062 is included in a third bit of that octet (e.g., fourth octet 424). Additionally, a type field 1064 is included in the octet (e.g., fifth octet 425) of one of the resource ID fields, the SSB Index in FIG. 10. In the example of FIG. 10, a reserve bit 1070 is included in a first bit position of the second octet 422 and the type field 1064 is included in a second bit position of the second octet 422.

In FIG. 11, an example field layout of a MAC CE 1100 including serving cell information for a single serving cell is illustrated. The MAC CE 1100 may include or correspond to the MAC CEs of FIG. 3. As illustrated in FIG. 11, the MAC CE 1100 includes a single serving cell ID field 1132 and two corresponding Resource ID fields 1142, 1152, similar to FIGS. 8 and 9. To illustrate, MAC CE 1100 includes (e.g., consists of) three octets. MAC CE 1100 includes a first serving cell ID field 1132 in a first octet 421 and a corresponding first type resource ID field 1142 in a second octet 422 and a corresponding second type resource ID field 1152 in a third octet 423.

The configuration and layout of the indicator fields and reserve bits is similar to the configuration and layout of the indicator fields and reserve bits of FIG. 10. Although in other implementations, the configuration and layout of the indicator fields and reserve bits may be the same as in one or more of the previous examples 4-9. In the example of FIG. 11, two reserve bits are included in first and second bits of the first octet and a configured field is included in a third bit. Additionally, a type field is included in the second octet. In the example of FIG. 11, a reserve bit is included in a first bit position of the second octet and the type field is included in a second bit position of the second octet.

Referring to FIGS. 12 and 13, ninth and tenth examples of MAC CE configurations that do not have one-to-one correspondence between serving cells and new beam information are illustrated. In such examples, an indicator (e.g., a bit, the configured field, or a joint field) may indicate whether or not a resource ID field is present in the MAC CE. Thus, when an indicator is used to indicate that no resource ID field is present the MAC CE, the MAC CE may be shorter and less overhead may be used in beam failure recovery operations.

In FIG. 12, an example field layout of a MAC CE 1200 including serving cell information for multiple serving cells is illustrated. The MAC CE 1200 may include or correspond to the MAC CEs of FIG. 3. As illustrated in FIG. 12, the MAC CE 1200 includes multiple serving cell ID fields where each serving cell ID field may not have a corresponding resource ID field. To illustrate, MAC CE 1200 includes a first serving cell ID field 1232 in a first octet 421 and a corresponding resource ID field 1242 in a second octet 422, and includes a second serving cell ID field 1234 in a third octet 423 with no corresponding resource ID field. MAC CE 1200 may include additional serving cell information and new beam information. Such a configuration may include or correspond to an interleaved configuration, similar to FIGS. 4, 5, 9, and 10.

In FIG. 13, an example field layout of a MAC CE 1300 including serving cell information for a multiple serving cells is illustrated. The MAC CE 1300 may include or correspond to the MAC CEs of FIG. 3. As illustrated in FIG. 13, the MAC CE 1300 the MAC CE 1300 includes multiple serving cell ID fields where each serving cell ID field may not have a corresponding resource ID field, similar to FIG. 12. MAC CE 1300 includes a first serving cell ID field 1332 in a first octet 421 and a second serving cell ID field 1334 in a second octet 422. The first serving cell ID field 1332 has a corresponding resource ID field 1342 in a third octet 423, and the second serving cell ID field 1334 does not have corresponding resource ID field (e.g., MAC CE 1300 includes (e.g., consists of) three octets). Such a configuration may include or correspond to a grouped configuration, similar to FIGS. 6 and 7. Although FIGS. 12 and 13 illustrate examples (of where the configured field indicates whether or not Resource ID fields are present in the MAC CE and indirectly a length of the MAC CE) a single type of Resource ID, such a configuration may be used with any of the above implementations. Additionally, in other implementation multiple types of resource fields, as in FIGS. 10 and 11, can be used when the configured field indicates whether or not the multiple types of resource ID fields are present in the MAC CE.

Although the configured field and type field have been illustrated as being a single bit in FIGS. 4-12, in other implementations, the configured field, the type field, or both may include more than one bit. For example, the configured field may include 2 bits and indicate one of four possibilities. To illustrate, the configured field may indicate not configured and included, not configured and not included, and/or configured and included. The configured field may additionally indicate a reserved value or null value, a configuration or order of resource ID fields, such as interleaved or grouped, or that multiple resource ID fields are configured. As another example, the type field may include 2 bits and may indicate one of four possibilities. To illustrate, the additional values/possibilities may indicate additional types of resources (e.g., new beam information or reference signals may be used) or that both/all types of new beam information is included. The type field may indicate a reserve or null value or a configuration or order of resource ID fields, such as interleaved or grouped, in addition.

Alternatively, the configured and type fields (e.g., 454 and 456) may be combined to form a joint indicator field in other implementations, such as joint fields 1352 and 1362 in FIG. 13. For example, a first value of a joint field may indicate not configured, a second value of a joint field may indicate configured and a first type of resource, and a third value of a joint field may indicate configured and a second type of resource. Additionally, a fourth value of a joint field may indicate configured and a third type of resource, may indicate not configured and not included, may indicate a reserved or null value, may indicate a configuration or order of resource ID fields (e.g., interleaved or grouped), etc.

Referring to FIGS. 14-18, examples of MAC CE configurations with bandwidth part information are illustrated. FIGS. 14 and 15, depict eleventh and twelfth examples of MAC CE configurations with bandwidth part information and having interleaved or grouped configurations, respectively. In the examples described herein, bandwidth part information includes (e.g., indicates) a BWP ID and is included in a BWP ID field or fields.

In FIG. 14, an example field layout of a MAC CE 1400 including serving cell information for multiple serving cells is illustrated. The MAC CE 1400 may include or correspond to the MAC CEs of FIG. 3. As illustrated in FIG. 14, the MAC CE 1400 includes multiple serving cell ID fields and includes multiple corresponding Resource ID fields in an alternating or interleaved configuration. To illustrate, MAC CE 1400 includes a first serving cell ID field 1432 and a corresponding first resource ID field 1442, and includes a second serving cell ID field 1434 and a corresponding second resource ID field 1444. The corresponding resource ID fields 1442, 1444 include the new beam information for the serving cell. As illustrative, non-limiting examples, the resource ID field (e.g., 1432, 1434, or both) may include SSB or NZP CSI-RS. The SSB may be a 6 bit value and the NZP CSI-RS may be an 8 bit value. Accordingly, the resource ID field (e.g., 1432, 1434, or both) may include padding or reserve bits to fill the remaining two bits of the 8 bit field/octet.

In FIG. 14, MAC CE 1400 also includes multiple BWP ID fields. To illustrate, the MAC 1440 includes a first BWP ID field 1492 corresponding to the first serving cell ID field 1432, and includes a second BWP ID field 1494 corresponding to the second serving cell ID field 1444. In the example of FIG. 14, the BWP ID fields 1492, 1494 are included in the same octet as the corresponding serving cell ID field, i.e., first and fourth octets in the example of FIG. 14. In other implementations, the BWP ID fields 1492, 1494 may be in a separate or own octet (e.g., second and fifth octets in the example of FIG. 14) or may be in the same octet as a corresponding resource ID field (e.g., third and sixth octets in the example of FIG. 14), as shown in FIG. 17.

In FIG. 14, MAC CE 1400 also includes indicator fields and reserve bits. In the example of FIG. 14, the indicator fields include two types of indicator fields for each serving cell ID field, similar to previous examples. To illustrate, MAC CE 1400 includes configured fields and type fields such as configured field 1462 and type field 1464.

As illustrated in the example of FIG. 14, the indicator fields are included in a different octet from the serving cell ID field (e.g., a 6 bit field) and are positioned in a rear of the octet. In other implementations, one or more of the indicator fields may be positioned in the same octet as the resource ID field or in the same octet as the serving cell ID field. Additionally or alternatively, the indicator fields may be positioned in other (e.g., any) positions, such as in the front of the octet, in the rear of the octet, split apart, etc.

MAC CE 1400 includes a reserved bit 1466 and a plurality of reserve bits 1460. As illustrated in FIG. 14, the reserve bit 1466 is in the same octet as a corresponding serving cell ID fields (e.g., 1434) and the plurality of reserve bits are in a different octet and with the indicators. In other implementations, the reserve bits, 1460 and 1466, may have other configurations and or positions, as described further herein. As an illustrative example, one of the indicators (e.g., 1462 or 1464) may be positioned in the bit position of the reserve bit 1466, and thus the reserve bits 1460 and reserve bit 1466 may be in the same octet. Additionally, or alternatively, the MAC CE 1400 may include additional fields or the fields of MAC CE may be rearranged, such as shown in FIG. 5-13 or 15-18.

In FIG. 15, an example field layout of a MAC CE 1500 having a grouped configuration and including serving cell information for multiple serving cells is illustrated. The MAC CE 1500 may include or correspond to the MAC CEs of FIG. 3. As illustrated in FIG. 15, the MAC CE 1500 includes multiple serving cell ID fields in a first portion (e.g., front portion) of the MAC CE 1500, and includes multiple corresponding Resource ID fields grouped together in a second portion (e.g., back portion) of the MAC CE 1500. To illustrate, MAC CE 1500 includes first and second serving cell ID fields 1532, 1534 in first octets (e.g., in sequential or contiguous octets without corresponding Resource ID fields between them) and includes corresponding first and second Resource ID fields 1542, 1544 in subsequent sequential or contiguous octets (i.e., fifth and sixth octets in FIG. 15). The configuration and layout of the BWP ID fields, the indicator fields, and the reserve bits correspond to the configuration and layout of the BWP ID fields, the indicator fields, and the reserve bits for FIG. 14. In other implementations, one or more of the BWP ID fields, the indicator fields, or the reserve bits may have a different configuration as described with reference to FIGS. 14, 17, and 18. Additionally or alternatively, the BWP ID fields may be grouped together and may be positioned before or after the resource ID fields 1542, 1544 in other implementations.

Referring to FIGS. 16 and 17, thirteenth and fourteenth examples of MAC CE configurations are illustrated. In FIG. 16, an example field layout of a MAC CE 1600 including serving cell information for a single serving cell is illustrated. The MAC CE 1600 may include or correspond to the MAC CEs of FIG. 3. As illustrated in FIG. 16, the MAC CE 1600 includes a single serving cell ID field and a single corresponding Resource ID field. To illustrate, MAC CE 1600 includes (e.g., consists of) three octets. MAC CE 1600 includes a first serving cell ID field 1632 in a first octet 421 and a corresponding first resource ID field 1642 in a third octet 423. A corresponding BWP ID field 1692 for the first serving cell ID field 1632 is positioned in the first octet 421 and the indicator fields 1662, 1664 are positioned in the second octet 422 in the example of FIG. 16. The reserve bit 1666 and reserved bits 1660 are in the first and second octets 421, 422, respectively.

Thus, the configuration and layout of the BWP ID fields, the indicator fields, and the reserve bits correspond to the configuration and layout of the BWP ID fields, the indicator fields, and the reserve bits for FIGS. 14 and 15. In other implementations, one or more of the BWP ID fields, the indicator fields, or the reserve bits may have a different configuration as described with reference to FIGS. 14, 17, and 18.

In FIG. 17, an example field layout of a MAC CE 1700 including serving cell information for a single serving cell is illustrated. The MAC CE 1700 may include or correspond to the MAC CEs of FIG. 3. As illustrated in FIG. 17, the MAC CE 1700 includes a single serving cell ID field and a single corresponding Resource ID field. To illustrate, MAC CE 1700 includes (e.g., consists of) two octets as compared to the three octets of MAC CE 1600 of FIG. 16. In such implementations, the corresponding Resource ID field may not have a length of 8 bits or a full octet (e.g., an SSB type Resource ID field). In the example of FIG. 17, MAC CE 1700 includes a first serving cell ID field 1732 in a first octet 421 and a corresponding first resource ID field 1742 and first BWP ID field 1792 in a second octet 422. The configuration and layout of the indicator fields and reserve bit correspond to the configuration and layout of the indicator fields and reserve bit for FIG. 5. To illustrate, a reserve bit is positioned in first bit position 410, a configured field is positioned in a second bit position 411, and a type field is positioned in a third bit position 412. In other implementations, the indicator fields and reserve bit may have other configurations, such as in FIG. 4.

Referring to FIG. 18, a fifteenth example of a MAC CE configuration that includes multiple fields for new beam information (e.g., multiple types of new beam information fields) is illustrated. In FIG. 18, an example field layout of a MAC CE 1800 including serving cell information for multiple serving cells is illustrated. The MAC CE 1800 may include or correspond to the MAC CEs of FIG. 3. As illustrated in FIG. 18, the MAC CE 1800 includes multiple serving cell ID fields and has an interleaved configuration of serving cell ID fields and corresponding Resource ID fields. In other implementations, the MAC CE may include a grouped configuration, similar to FIGS. 6, 7, and 15.

In the example of FIG. 18, MAC CE 1800 include two different types of Resource ID fields, SSB Index and NZP CSI-RS Resource ID, for each serving cell ID field. To illustrate, MAC CE 1800 includes a first serving cell ID field 1832 in a first octet 421 and two corresponding resource ID fields (1842, 1852) in second octet and third octets 422, 423. In the example of FIG. 18, MAC CE 1800 includes a corresponding first type resource ID field 1842 in a second octet 422 and a corresponding second type resource ID field 1852 in a third octet 423 for the first serving cell ID field 1832. MAC CE 1800 also includes a second serving cell ID field 1834 in a fourth octet 424 and a corresponding first type resource ID field 1844 in a fifth octet 425 and a corresponding second type resource ID field 1854 in a sixth octet for the second serving cell ID field 1834.

MAC CE 1800 includes BWP IDs in the same octets as the corresponding serving cell ID fields. To illustrate, a first BWP ID field is in the first octet and a second BWP ID field is in a fourth octet. In other implementations, the BWP ID field may be included in a different octet, such as in the same octet as one of the Resource ID fields, similar to FIG. 17, or its own dedicated octet, similar to FIG. 14.

The configuration and layout of the indicator fields and reserve bits of the MAC CE 1800 differ from the previous examples. Although, in other implementations, the configuration and layout of the indicator fields and reserve bits may be the same as in one or more of the previous examples. In the example of FIG. 18, a reserve bit is included in a first bit of an octet where a serving cell ID field is positioned, and configured and type fields are included with one of the Resource ID fields. As illustrated in FIG. 18, the configured field is included in a first bit of that octet (e.g., second octet 422) and the type field is included in a second bit of that octet (e.g., second octet 422).

Similar to the MAC CEs of FIGS. 12 and 13, one or more of the MAC CEs of FIGS. 10, 11, and 14-18 may include a field (e.g., configured field) which indicates whether a corresponding field (e.g., BWP ID field) is present or may include a joint field. When a configured field is included in a MAC CE to indicate presence of a field or fields, the configured field may indicate whether one or more of a first corresponding Resource ID field (e.g., SSB field), a second corresponding Resource ID field (e.g., NZP CSI-RS field), or a corresponding BWP ID field, are present. For example, the configured field may be 2 or 3 bits long and may indicate whether each of the above fields are included in the MAC CE. As another example, such as for MAC CEs with multiple Resource ID fields per serving cell, the configured field may be two bits and indicate whether one or both of the multiple Resource ID fields are included in the MAC CE.

When a joint field is included in a MAC CE, the joint field may be configured to provide different indications about new beam information (e.g., Resource ID fields), bandwidth part information, or both. For example, the joint field may be multiple bits (e.g., 3 or 4 bits) long and may indicate different combinations of indications about new beam information and bandwidth part information, such as whether the fields are included, how they are configured, where they are located etc.

Although each of FIGS. 14-18 each include resource ID fields to illustrate placement and layout of fields of MAC CEs for BFR, in other implementations a MAC CE may not include a resource ID field (e.g., may not include new beam information). In such implementations, the MAC CE includes serving cell identification information and bandwidth part information.

Figures 19, 20:
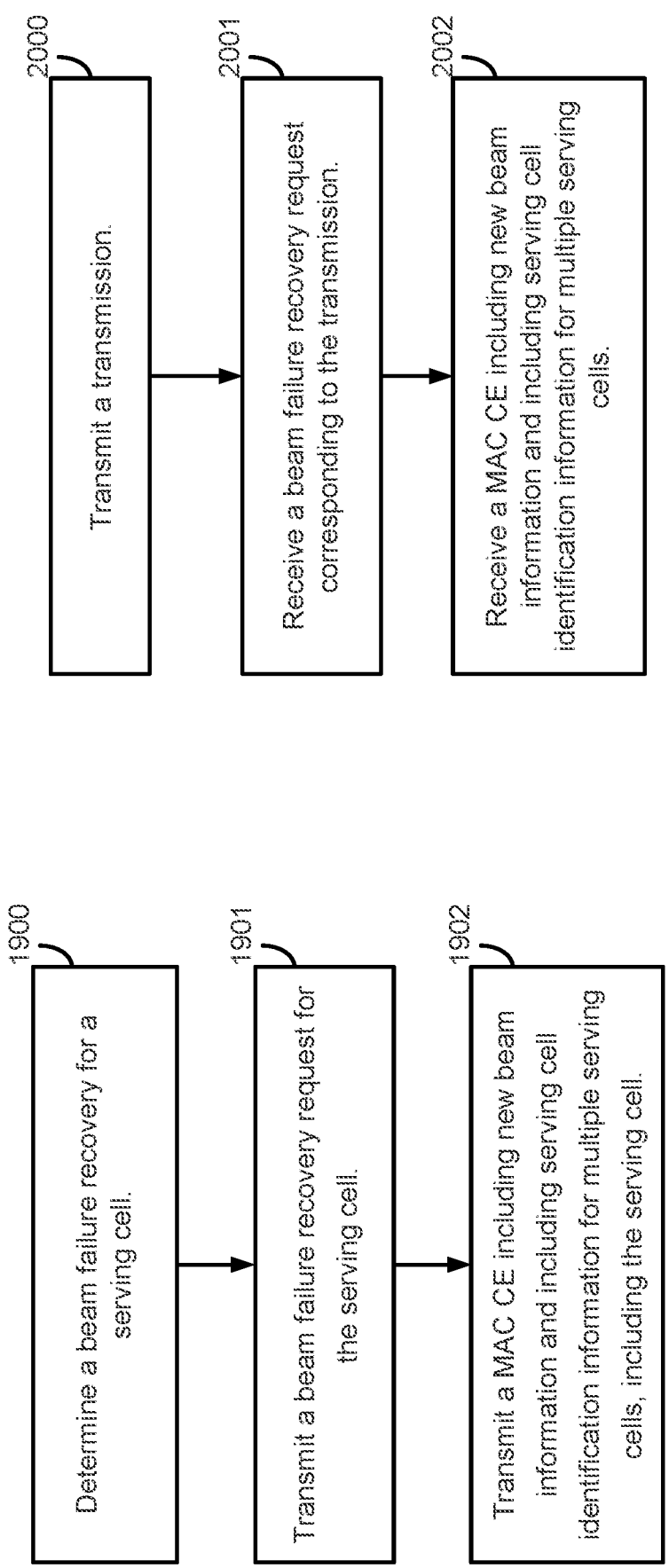
FIG. 19 is a block diagram illustrating example blocks executed by a UE configured according to an aspect of the present disclosure.
FIG. 20 is a block diagram illustrating example blocks executed by a base station configured according to an aspect of the present disclosure.
Figure 21:
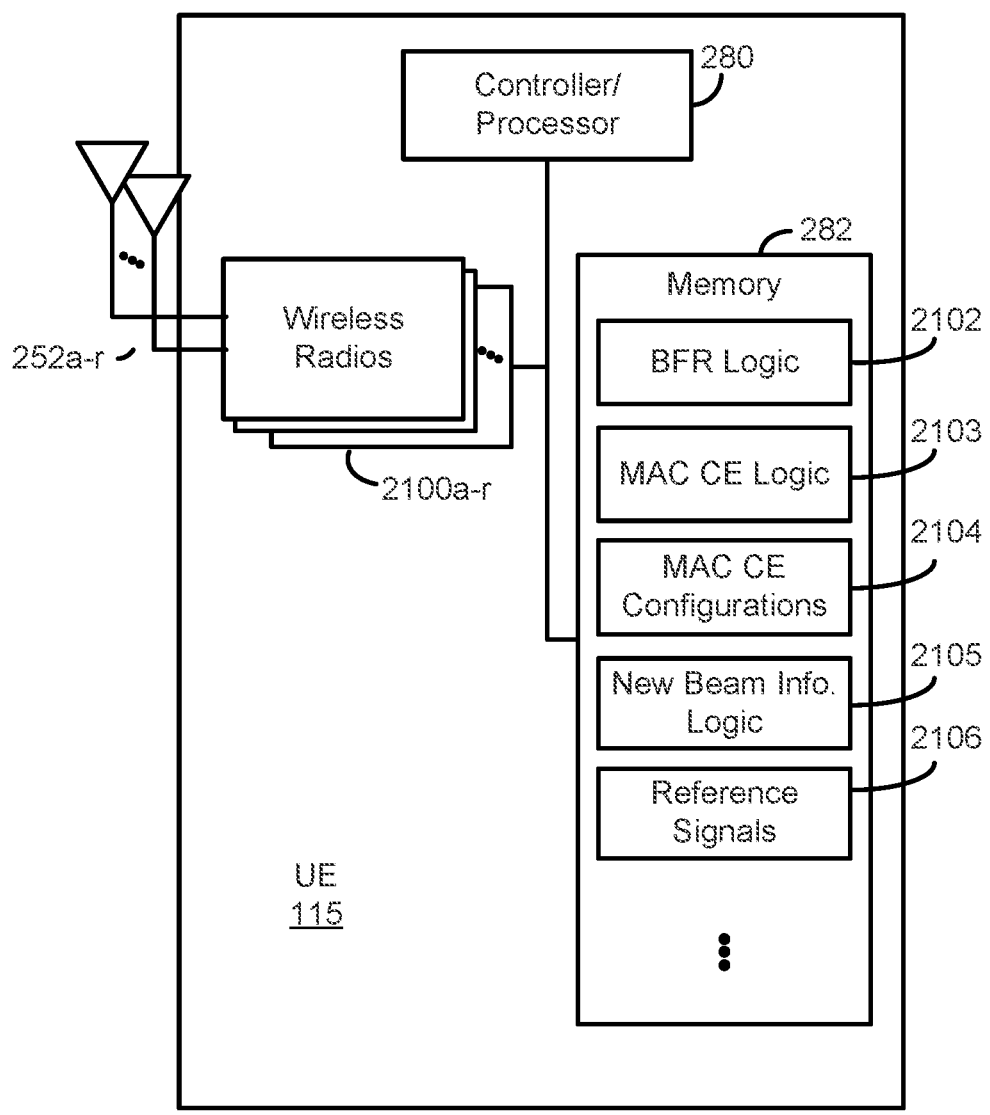
FIG. 21 is a block diagram conceptually illustrating a design of a UE according to some embodiments of the present disclosure.

FIG. 19 is a block diagram illustrating example blocks executed by a UE configured according to an aspect of the present disclosure. The example blocks will also be described with respect to UE 115 as illustrated in FIG. 21. FIG. 21 is a block diagram illustrating UE 115 configured according to one aspect of the present disclosure. UE 115 includes the structure, hardware, and components as illustrated for UE 115 of FIG. 2. For example, UE 115 includes controller/processor 280, which operates to execute logic or computer instructions stored in memory 282, as well as controlling the components of UE 115 that provide the features and functionality of UE 115. UE 115, under control of controller/processor 280, transmits and receives signals via wireless radios 2100a-r and antennas 252a-r. Wireless radios 2100a-r includes various components and hardware, as illustrated in FIG. 2 for UE 115, including modulator/demodulators 254a-r, MIMO detector 256, receive processor 258, transmit processor 264, and TX MIMO processor 266. As illustrated in the example of FIG. 21, memory 282 stores Beam Failure Recovery (BFR) logic 2102, MAC CE logic 2103, MAC CE configuration data 2104, new beam information logic 2105, and reference signals 2106.

At block 1900, a mobile communication device, such as a UE, determines a beam failure recovery for a serving cell. A UE, such as UE 115, may execute, under control of controller/processor 280, Beam Failure Recovery logic 2102, stored in memory 282. The execution environment of Beam Failure Recovery logic 2102 provides the functionality for UE 115 to define and perform the Beam Failure Recovery procedures. The execution environment of Beam Failure Recovery logic 2102 defines the different Beam Failure Recovery processes, such as determining a Beam Failure, determining whether to perform a Beam Failure Recovery, determining a Beam Failure Recovery mode, determining a serving cell ID for the Beam Failure Recovery, determining a MAC CE configuration, signaling a MAC CE configuration and/or a BFR MAC CE capability, etc. UE 115 may monitor a medium for a downlink message (e.g., a DCI or PDSCH) via antennas 252a-r and wireless radios 2100a-r. UE 115 may determine a failed transmission and/or channel conditions are poor. UE 115 may optionally send an acknowledgement message responsive to the downlink message to indicate failed reception and/or decoding of the downlink message.

In some implementations, the downlink message is a dynamic grant. In other implementations, the downlink message is a periodic grant. The UE 115 may schedule or determine a schedule for upcoming the downlink transmission (or transmission) based on the dynamic grant (or periodic grant), and may monitor for and receive such downlink transmission(s) using antennas 252a-r and wireless radios 2100a-r.

At block 1901, the UE 115 transmits a beam failure recovery request for the serving cell. The UE 115 transmits an uplink transmission including a BFRQ (e.g., BFRQ of 354) via wireless radios 2100a-r and antennas 252a-r. The execution environment of Beam Failure Recovery logic 2102 provides UE 115 the functionalities described with respect to the various aspects of the present disclosure, such as determining whether to send a BFRQ, generating a BFRQ, and transmitting the BFRQ. To illustrate, within the execution environment of Beam Failure Recovery logic 2102, UE 115, under control of controller/processor 280, may determine that a beam failure recovery operation has been initiated and may generate a corresponding BFRQ, which is transmitted via wireless radios 2100a-r and antennas 252a-r.

At block 1902, the UE 115 transmits a MAC CE including new beam information and including serving cell identification information for multiple serving cells, including the serving cell. The UE 115 transmits a BFR MAC CE (e.g., 356) via wireless radios 2100a-r and antennas 252a-r. The uplink transmission of or corresponding to the BFRQ may include the MAC CE as a header (e.g., MAC header) or preamble for an accompanying physical layer signal (e.g., symbol or waveform) indicating the BFRQ. Alternatively, a second uplink transmission may include the MAC CE as a header (e.g., MAC header) or preamble for an accompanying physical layer signal (e.g., symbol or waveform) or the second uplink transmission may include the MAC CE as payload data, i.e., indicated by the physical layer signal.

The execution environment of Beam Failure Recovery logic 2102 provides UE 115 the functionalities described with respect to the various aspects of the present disclosure, such as determining an intended CC ID. To illustrate, within the execution environment of Beam Failure Recovery logic 2102, UE 115, under control of controller/processor 280, may determine a configuration for the MAC CE based on a mode or may determine a BFR MAC CE configuration based on a configuration message, a capabilities message, or a combination thereof. As an illustrative example, UE 115 determines the MAC CE configuration for the MAC-CE based on a configuration message sent to or received from a network entity. As another illustrative example, UE 115 determines the MAC CE configuration for the MAC CE based on a capabilities message sent to or received from a network entity. To illustrate, within the execution environment of Beam Failure Recovery logic 2102, UE 115, under control of controller/processor 280, may generate the MAC CE based on the identified configuration. For example, generating the MAC CE based on a configuration may include generating a layout of the MAC CE, a length of the MAC CE, a number and type of fields of the MAC CE, positions of the fields of the MAC CE, values of fields of the MAC CE, or a combination thereof. After generation of the MAC CE, UE 115 transmits the MAC CE using antennas 252a-r and wireless radios 2100a-r.

The UE 115 may execute additional blocks (or the UE 115 may be configured further perform additional operations) in other implementations. For example, the UE 115 may attempt to decode the transmission, determine a power level of the transmission, compared the determined power level of the transmission to a power level threshold, determine a beam failure for the transmission, other transmissions (e.g., other serving cells), or a combination thereof. As other examples, the UE may transmit or receive a capabilities message, a configuration message, or a mode message. Additionally or alternatively, the MAC CE may further include BWP ID data (e.g., 399). The BWP ID data may be included in a BWP ID field, as in FIGS. 14-18. In some such BWP implementations, a MAC CE may not include new beam information. As another example, the UE 115 may perform one or more operations described above. As yet another example, the UE 115 may perform one or more aspects as described below.

In a first aspect, the multiple serving cells comprise multiple secondary serving cells.

In a second aspect, alone or in combination with one or more of the above aspects, the UE 115 determines multiple beam failure recoveries for the multiple secondary serving cells, including the serving cell, and transmits multiple beam failure recovery requests for the multiple secondary serving cells, wherein the serving cell identification information of the MAC CE identifies the multiple secondary serving cells.

In a third aspect, alone or in combination with one or more of the above aspects, the UE 115 encodes the MAC CE based on one or more indicator fields of the MAC CE.

In a fourth aspect, alone or in combination with one or more of the above aspects, the UE 115 encoding the MAC CE based on the one or more indicator fields includes: setting a corresponding resource ID field to a null value responsive to determining a configured field has a first value.

In a fifth aspect, alone or in combination with one or more of the above aspects, the UE 115 encoding, by the UE, the MAC CE based on the one or more indicator fields includes: encoding a corresponding resource ID field to indicate the new beam information responsive to determining a configured field has a second value.

In a sixth aspect, alone or in combination with one or more of the above aspects, the new beam information comprises reference signal information.

In a seventh aspect, alone or in combination with one or more of the above aspects, the serving cell identification information includes a plurality of serving cell ID fields.

In an eighth aspect, alone or in combination with one or more of the above aspects, the new beam information includes a plurality of resource ID fields.

In a ninth aspect, alone or in combination with one or more of the above aspects, the UE 115 determines a second beam failure recovery for a particular secondary serving cell, transmits a second beam failure recovery request for the particular secondary serving cell, and transmits a second MAC CE including second serving cell identification information and second new beam information for a single serving cell, wherein the second new beam information comprises beam information for a new beam that corresponds to the determined beam failure recovery for the particular secondary serving cell.

In a tenth aspect, alone or in combination with one or more of the above aspects, the new beam information includes a single resource ID field.

In an eleventh aspect, alone or in combination with one or more of the above aspects, the new beam information includes a plurality of resource ID fields.

In a twelfth aspect, alone or in combination with one or more of the above aspects, the plurality of resource ID fields, and include multiple resource ID fields for a single serving cell of the multiple serving cells.

In a thirteenth aspect, alone or in combination with one or more of the above aspects, the multiple resource ID fields for a single serving cell include a SSB and an NZP CSI-RS.

In a fourteenth aspect, alone or in combination with one or more of the above aspects, the serving cell identification information includes a plurality of serving cell ID fields, and wherein the plurality of resource ID fields are positioned after a last serving cell ID field of the plurality of serving cell ID fields.

In a fifteenth aspect, alone or in combination with one or more of the above aspects, the MAC CE further includes one or more indicator fields, the one or more indicator fields configured to indicate a structure of the MAC CE.

In a sixteenth aspect, alone or in combination with one or more of the above aspects, the one or more indicator fields includes a configured field, and wherein the configured field is configured to indicate if the new beam information is included in the MAC CE.

In a seventeenth aspect, alone or in combination with one or more of the above aspects, the configured field is configured to indicate whether a new beam information field is included in the MAC CE.

In a eighteenth aspect, alone or in combination with one or more of the above aspects, the MAC CE further includes one or more reserve bits.

Accordingly, a UE and a base station may perform Beam Failure Recovery operations using MAC CE. By performing Beam Failure Recovery operations using a MAC CE, Beam Failure Recovery operations may be performed more quickly, as compared to conventional Beam Failure Recovery and/or RACH based Beam Failure Recovery procedures. Thus, latency and overhead are reduced and throughput and reliability are increased.

Figure 22:
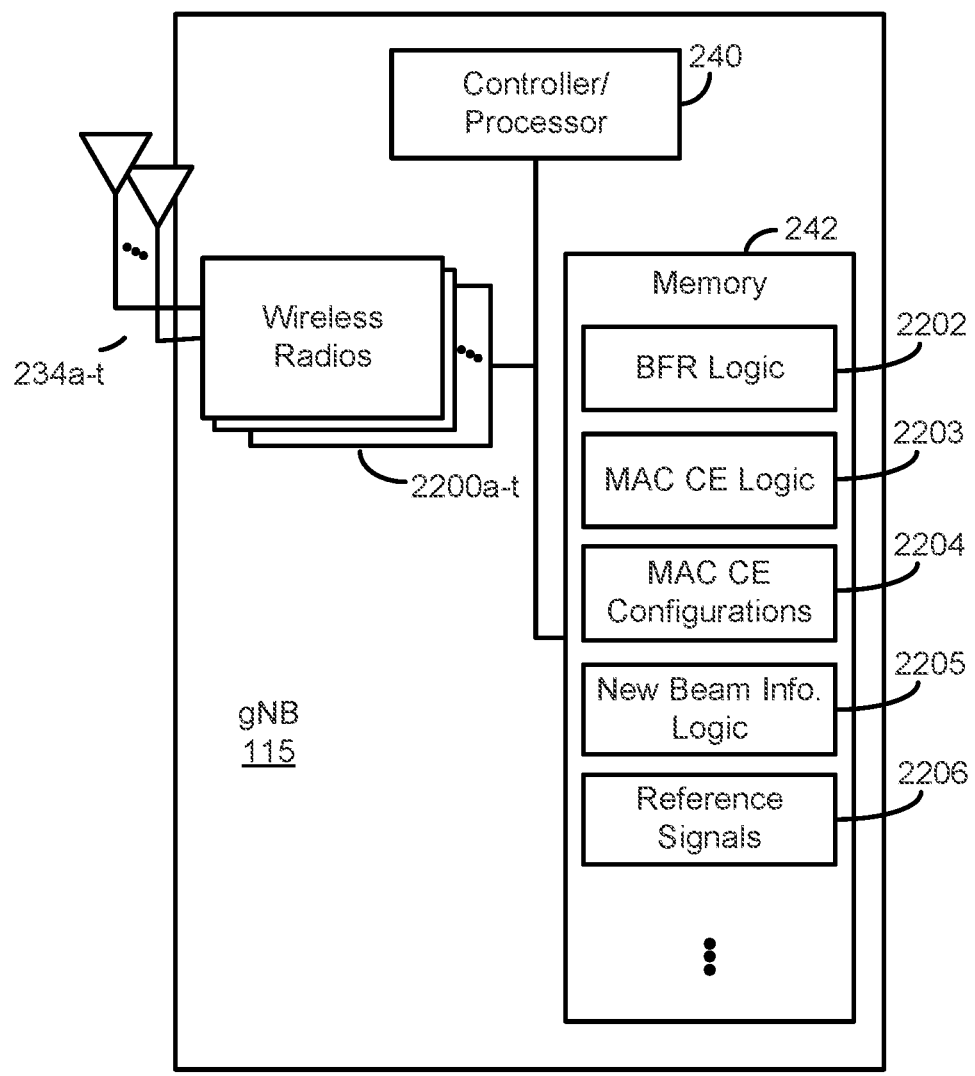
FIG. 22 is a block diagram conceptually illustrating a design of a base station configured according to some embodiments of the present disclosure.

FIG. 20 is a block diagram illustrating example blocks executed by a base station configured according to an aspect of the present disclosure. The example blocks will also be described with respect to gNB 105 (or eNB) as illustrated in FIG. 22. FIG. 22 is a block diagram illustrating gNB 105 configured according to one aspect of the present disclosure. The gNB 105 includes the structure, hardware, and components as illustrated for gNB 105 of FIG. 2. For example, gNB 105 includes controller/processor 240, which operates to execute logic or computer instructions stored in memory 242, as well as controlling the components of gNB 105 that provide the features and functionality of gNB 105. The gNB 105, under control of controller/processor 240, transmits and receives signals via wireless radios 2200a-t and antennas 234a-r. Wireless radios 2200a-t includes various components and hardware, as illustrated in FIG. 2 for gNB 105, including modulator/demodulators 232a-t, MIMO detector 236, receive processor 238, transmit processor 220, and TX MIMO processor 230. The data 2202-2208 in memory 242 may include or correspond to the data 2102-2108 in memory 282, respectively.

At block 2000, a mobile communication device, such as a gNB, transmits a transmission. A gNB, such as gNB 105, may generate and transmit a downlink transmission via antennas 234a-t and wireless radios 2200a-t. The execution environment of transmission logic may define the different transmission processes, such dynamic or periodic transmission processes. Within the execution environment of the transmission logic (and optionally encoder logic), gNB 105, under control of controller/processor 240, generates and encodes the transmission to be transmitted via antennas 234a-t and wireless radios 2200a-t.

At block 2001, the gNB 105 receives a beam failure recovery request corresponding to the transmission. The gNB 105 receives an uplink transmission including a BFRQ via antennas 234a-t and wireless radios 2200a-t. The gNB 105 may execute, under control of controller/processor 240, Beam Failure Recovery logic 2202, stored in memory 242. The execution environment of Beam Failure Recovery logic 2202 provides the functionality for gNB 105 to define and perform the Beam Failure Recovery procedures. In some implementations, the Beam Failure Recovery logic 2202 may identify if MAC CEs are enabled for Beam Failure Recovery procedures, a particular MAC CE configuration, or both.

At block 2002, the gNB 105 receives a MAC CE including new beam information and including serving cell identification information for multiple serving cells. The gNB 105 receives a MAC CE via antennas 234a-t and wireless radios 2200a-t. The MAC CE may be received in the same uplink transmission as the BFRQ, i.e., the same uplink transmission as in block 2001, or a different, second uplink transmission. When received with the BFRQ, the uplink transmission may include the MAC CE as a header (e.g., MAC header) or preamble for an accompanying physical layer signal (e.g., symbol or waveform) indicating the BFRQ. Alternatively, when received in the second uplink transmission, the MAC CE may be a header (e.g., MAC header) or preamble for an accompanying second physical layer signal (e.g., symbol or waveform) or the second uplink transmission may include the MAC CE as payload data, i.e., indicated by the second physical layer signal.

In some implementations, within the execution environment of the Beam Failure Recovery logic 2202 (and optionally decoder logic), gNB 105, under control of controller/processor 240, parses the MAC CE to determine serving cell information (e.g., serving cell identification information) and/or new beam information. In some implementations, the gNB 105 parses the MAC CE based on configuration information from a capabilities message, a configuration message, or the BFRQ. Additionally, or alternatively, the gNB 105 parses the MAC CE based on configuration information indicated by the MAC CE, such as one or more indicators (e.g., configured fields, type fields, joint fields, etc.) thereof. As an illustrative, non-limiting example, the gNB 105 parses the MAC CE based on one or more of a configured field, a type field, or a joint field. To illustrate, the gNB 105 parses the MAC CE based on a value of the configured field, then the gNB 105 either parses or ignores a corresponding type field and/or corresponding Resource ID field(s) based on the value of the configured field. As another illustration, the gNB 105 parses the MAC CE based on a value of the type field, then parses and/or decodes the Resource ID field or fields based on the values of the type field.

The gNB 105 (or another base station or network entity) may execute additional blocks (or the gNB 105 may be configured further perform additional operations) in other implementations. For example, the gNB 105 may transmit a response or acknowledgment message responsive to the BFRQ, the MAC CE, or both, may transmit a second transmission (may transmit a repetition of the failed transmission or a retransmission of the data of the failed transmission sent at block 2000), or a combination thereof, after block 2002. Additionally or alternatively, the MAC CE may further include BWP ID data (e.g., 399). The BWP ID data may be included in a BWP ID field, as in FIGS. 14-18. In some such BWP implementations, a MAC CE may not include new beam information. As another example, the gNB 105 may perform one or more operations described above. As yet another example, the gNB 105 may perform one or more aspects as described below.

In a first aspect, the multiple serving cells comprise multiple secondary serving cells.

In a second aspect, alone or in combination with one or more of the above aspects, the gNB 105 receives multiple beam failure recovery requests for the multiple secondary serving cells, wherein the serving cell identification information of the MAC CE identifies the multiple secondary serving cells.

In a third aspect, alone or in combination with one or more of the above aspects, the gNB 105 parses the MAC CE based on one or more indicator fields of the MAC CE.

In a fourth aspect, alone or in combination with one or more of the above aspects, the gNB 105 parsing the MAC CE based on the one or more indicator fields includes: ignoring a corresponding resource ID field responsive to determining a configured field has a first value.

In a fifth aspect, alone or in combination with one or more of the above aspects, the gNB 105 parsing the MAC CE based on the one or more indicator fields includes: parsing a corresponding resource ID field to determine the new beam information responsive to determining a configured field has a second value.

In a sixth aspect, alone or in combination with one or more of the above aspects, the new beam information includes one or more resource ID fields.

In a seventh aspect, alone or in combination with one or more of the above aspects, the one or more resource ID fields include a plurality of resource ID fields, and the wherein the plurality of resource ID fields include multiple resource ID fields for a single serving cell of the multiple serving cells.

In an eighth aspect, alone or in combination with one or more of the above aspects, the serving cell identification information includes a plurality of serving cell ID fields, and wherein the plurality of resource ID fields are positioned after a last serving cell ID field of the plurality of serving cell ID fields.

Accordingly, the UE and gNB may use MAC CEs to perform Beam Failure Recovery operations. By using MAC CEs to perform Beam Failure Recovery operations, beam forming recovery requests and corresponding information may be more quickly transmitted by UEs and processed by network entities. Thus, latency and overhead are reduced and throughput and reliability are increased.

Although, FIGS. 19 and 20 are directed to implementation where a BFR MAC CE indicates multiple serving cells, such as multiple secondary serving cells (SCells), in other implementations BFR MAC CEs may indicate a single serving cell, such as a single secondary serving cell. Additionally, or alternatively, although FIGS. 19 and 20 illustrate a BFR MAC CE that includes new beam information, in other implementations a BFR MAC CE may not include new beam information at all or may not include new beam information for some serving cells when multiple serving cells are identified.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The functional blocks and modules described herein (e.g., the functional blocks and modules in FIG. 2) may comprise processors, electronics devices, hardware devices, electronics components, logical circuits, memories, software codes, firmware codes, etc., or any combination thereof.

Those of skill would further appreciate that the various illustrative logical blocks, modules, circuits, and algorithm steps (e.g., the logical blocks in FIGS. 19 and 20) described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. Computer-readable storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, a connection may be properly termed a computer-readable medium. For example, if the software is transmitted from a website, server, or other remote source using a coaxial cable, fiber optic cable, twisted pair, or digital subscriber line (DSL), then the coaxial cable, fiber optic cable, twisted pair, or DSL, are included in the definition of medium. Disk and disc, as used herein, includes compact disc (CD), laser disc, optical disc, digital versatile disc (DVD), hard disk, solid state disk, and blu-ray disc where disks usually reproduce data magnetically, while discs reproduce data optically with lasers. Combinations of the above should also be included within the scope of computer-readable media.

As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C) or any of these in any combination thereof.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method of wireless communication comprising:
   determining, by a user equipment (UE), a beam failure recovery for a serving cell;
   transmitting, by the UE, a beam failure recovery request for the serving cell; and
   transmitting, by the UE, a medium access control control element (MAC CE) including new beam information and including serving cell identification information for multiple serving cells, including the serving cell, wherein the serving cell identification information identifies the multiple serving cells, wherein the new beam information includes one or more resource ID fields, wherein the MAC CE further includes one or more indicator fields configured to indicate whether a corresponding resource ID field of the one or more resource ID fields includes one of reference signal resource information or reserve bits, and wherein when an indicator field of the one or more indicator fields has a first value, the corresponding resource ID field includes the reserve bits, and when the indicator field has a second value, the corresponding resource ID field includes the reference signal resource information.

2. The method of claim 1, wherein the multiple serving cells comprise multiple secondary serving cells.

3. The method of claim 2, further comprising:
   determining, by the UE, multiple beam failure recoveries for the multiple secondary serving cells, including the serving cell; and
   transmitting, by the UE, multiple beam failure recovery requests for the multiple secondary serving cells, wherein the serving cell identification information of the MAC CE identifies the multiple secondary serving cells.

4. The method of claim 1, further comprising:
   encoding, by the UE, the MAC CE based on one or more indicator fields of the MAC CE.

5. The method of claim 4, wherein encoding, by the UE, the MAC CE based on the one or more indicator fields includes:
   responsive to determining a configured field has a first value:
      setting a corresponding resource ID field to a null value.

6. The method of claim 4, wherein encoding, by the UE, the MAC CE based on the one or more indicator fields includes:
   responsive to determining a configured field has a second value:
      encoding a corresponding resource ID field to indicate the new beam information.

7. The method of claim 1, wherein the new beam information includes a plurality of resource ID fields, each resource ID field comprising reference signal information.

8. The method of claim 1, wherein the serving cell identification information includes a plurality of serving cell ID fields.

9. The method of claim 1, further comprising:
   determining, by the UE, a second beam failure recovery for a particular secondary serving cell;
   transmitting, by the UE, a second beam failure recovery request for the particular secondary serving cell; and
   transmitting, by the UE, a second MAC CE including second serving cell identification information and second new beam information for a single serving cell, wherein the second new beam information comprises beam information for a new beam that corresponds to the determined second beam failure recovery for the particular secondary serving cell.

10. An apparatus configured for wireless communication, the apparatus comprising:
    at least one processor; and
    a memory coupled to the at least one processor,
    wherein the at least one processor is configured:
       to determine, by a user equipment (UE), a beam failure recovery for a serving cell;

to transmit, by the UE, a beam failure recovery request for the serving cell; and to transmit, by the UE, a medium access control control element (MAC CE) including new beam information and including serving cell identification information for multiple serving cells, including the serving cell, wherein the serving cell identification information identifies the multiple serving cells, wherein the new beam information includes one or more resource ID fields, and wherein the MAC CE further includes one or more indicator fields configured to indicate whether a corresponding resource ID field of the one or more resource ID fields includes one of reference signal resource information or reserve bits, and wherein when an indicator field of the one or more indicator fields has a first value, the corresponding resource ID field includes the reserve bits, and when the indicator field has a second value, the corresponding resource ID field includes the reference signal resource information.

11. The apparatus of claim 10, wherein the new beam information includes a single resource ID field.

12. The apparatus of claim 10, wherein the new beam information includes a plurality of resource ID fields.

13. The apparatus of claim 12, wherein the plurality of resource ID fields include multiple resource ID fields for a single serving cell of the multiple serving cells, wherein the multiple resource ID fields for a single serving cell include a synchronization signal block (SSB) field and a non-zero power channel state information reference signal received power (NZP CSI-RS) field.

14. The apparatus of claim 13, wherein the serving cell identification information includes a plurality of serving cell ID fields, and wherein the plurality of resource ID fields are positioned after a last serving cell ID field of the plurality of serving cell ID fields.

15. The apparatus of claim 10, wherein the one or more indicator fields are configured to indicate a structure of the MAC CE.

16. The apparatus of claim 15, wherein the one or more indicator fields includes a configured field, and wherein the configured field is configured to indicate if the new beam information is included in the MAC CE.

17. The apparatus of claim 16, wherein the one or more indicator fields are configured to indicate whether a new beam information field is included in the MAC CE.

18. The apparatus of claim 10, wherein the one or more indicator fields include a configured field for each serving cell indicated by the serving cell identification information that indicates, and wherein:
when the configured field has the second value, the corresponding resource ID field of the one or more resource ID fields indicates the reference signal resource information; or
when the configured field has the first value, the corresponding resource ID field has reserve bits and does not indicate the reference signal resource information.

19. The apparatus of claim 18, wherein the reference signal resource information comprises synchronization signal block (SSB) information or channel state information reference signal received power (CSI-RSRP) information.

20. The apparatus of claim 10, wherein the serving cell identification information includes a plurality of serving indicators, and wherein the one or more resource ID fields are positioned after a last serving cell indicator of the plurality of serving cell indicators.

21. A method of wireless communication comprising:
transmitting, by a base station, a transmission;
receiving, by the base station, a beam failure recovery request corresponding to the transmission; and
receiving, by the base station, a medium access control control element (MAC CE) including new beam information and including serving cell identification information for multiple serving cells, wherein the serving cell identification information identifies the multiple serving cells, wherein the new beam information includes one or more resource ID fields, and wherein the MAC CE further includes one or more indicator fields configured to indicate whether a corresponding resource ID field of the one or more resource ID fields includes one of reference signal resource information or reserve bits, and wherein when an indicator field of the one or more indicator fields has a first value, the corresponding resource ID field includes the reserve bits, and when the indicator field has a second value, the corresponding resource ID field includes the reference signal resource information.

22. The method of claim 21, wherein the multiple serving cells comprise multiple secondary serving cells, and further comprising:
receiving, by the base station, multiple beam failure recovery requests for the multiple secondary serving cells, wherein the serving cell identification information of the MAC CE identifies the multiple secondary serving cells.

23. The method of claim 21, further comprising:
parsing, by the base station, the MAC CE based on the one or more indicator fields of the MAC CE.

24. The method of claim 23, wherein parsing, by the base station, the MAC CE based on the one or more indicator fields includes:
responsive to determining a configured field has a first value:
ignoring a corresponding resource ID field.

25. The method of claim 23, wherein parsing, by the base station, the MAC CE based on the one or more indicator fields includes:
responsive to determining a configured field has a second value:
parsing a corresponding resource ID field to determine the new beam information.

26. An apparatus configured for wireless communication, the apparatus comprising:
at least one processor; and
a memory coupled to the at least one processor,
wherein the at least one processor is configured:
to transmit, by a base station, a transmission;
to receive, by the base station, a beam failure recovery request corresponding to the transmission; and
to receive, by the base station, a medium access control control element (MAC CE) including new beam information and including serving cell identification information for multiple serving cells, wherein the serving cell identification information identifies the multiple serving cells, wherein the new beam information includes one or more resource ID fields, wherein the MAC CE further includes one or more indicator fields configured to indicate whether a corresponding resource ID field of the one or more resource ID fields includes one of reference signal resource information or reserve bits, and wherein when an indicator field of the one or more indicator fields has a first value, the corresponding resource ID field includes the reserve bits, and when the indicator field has a second value, the corresponding resource ID field includes the reference signal resource information.

27. The apparatus of claim 26, wherein the new beam information includes one or more resource ID fields.

28. The apparatus of claim 27, wherein the one or more resource ID fields include a plurality of resource ID fields, and the wherein the plurality of resource ID fields include multiple resource ID fields for a single serving cell of the multiple serving cells.

29. The apparatus of claim 27, wherein the serving cell identification information includes a plurality of serving cell ID fields, and wherein the one or more resource ID fields are positioned after a last serving cell ID field of the plurality of serving cell ID fields.

30. The apparatus of claim 26, wherein the serving cell identification information includes a plurality of serving indicators, and wherein the one or more resource ID fields are positioned after a last serving cell indicator of the plurality of serving cell indicators.

* * * * *